(12) United States Patent
Liu et al.

(10) Patent No.: US 12,519,394 B2
(45) Date of Patent: Jan. 6, 2026

(54) MULTI-LEVEL SWITCHING CONVERTER CIRCUIT AND MULTI-LEVEL SWITCHING CONVERSION METHOD

(71) Applicant: Richtek Technology Corporation, Hsinchu (TW)

(72) Inventors: Kuo-Chi Liu, Hsinchu (TW); Ta-Yung Yang, Taoyuan (TW)

(73) Assignee: Richtek Technology Corporation, Hsinchu (TW)

( * ) Notice: Subject to any disclaimer, the term of this patent is extended or adjusted under 35 U.S.C. 154(b) by 176 days.

(21) Appl. No.: 18/595,467

(22) Filed: Mar. 5, 2024

(65) Prior Publication Data

US 2024/0405683 A1 Dec. 5, 2024

Related U.S. Application Data

(60) Provisional application No. 63/505,064, filed on May 31, 2023.

(51) Int. Cl.
| | |
|---|---|
| *H02M 3/158* | (2006.01) |
| *H02M 1/00* | (2006.01) |
| *H02M 3/07* | (2006.01) |
| *H02M 7/483* | (2007.01) |

(52) U.S. Cl.
CPC ....... *H02M 3/1586* (2021.05); *H02M 1/0009* (2021.05); *H02M 1/0095* (2021.05); *H02M 3/07* (2013.01); *H02M 3/158* (2013.01); *H02M 7/4837* (2021.05); *H02M 7/4833* (2021.05)

(58) Field of Classification Search
CPC ............ H02M 7/4837; H02M 7/4833; H02M 1/0095; H02M 1/0009; H02M 3/158; H02M 3/07; H02M 3/1586
See application file for complete search history.

(56) References Cited

U.S. PATENT DOCUMENTS

| | | | | |
|---|---|---|---|---|
| 10,686,370 | B1* | 6/2020 | Bonnano | H02M 3/158 |
| 11,228,256 | B2* | 1/2022 | Zilio | H02M 3/158 |
| 11,368,089 | B2* | 6/2022 | Chakraborty | H02M 3/1584 |
| 2016/0329809 | A1* | 11/2016 | Granato | H02M 3/158 |
| 2024/0258925 | A1* | 8/2024 | Tang | H02M 3/1582 |

* cited by examiner

*Primary Examiner* — Jue Zhang
*Assistant Examiner* — Jye-June Lee
(74) *Attorney, Agent, or Firm* — Huan-Yi Lin

(57) ABSTRACT

A multi-level switching converter circuit for converting a first voltage to a second voltage or convert the second voltage to the first voltage, includes: a power stage circuit and a control circuit. Through a valley current mode control, the conversion control circuit generates a first ramp signal to determine a first duty ratio of the first control signal, and generates a second ramp signal to determine a second duty ratio of the second control signal, thereby a switching node connected to one end of an inductor is switched between two of k levels of voltages, such that the first voltage or the second voltage is regulated to a predetermined target level, and a flying capacitor voltage across the flying capacitor is regulated and balanced at one (k−1)th of the first voltage.

30 Claims, 10 Drawing Sheets

MULTI-LEVEL SWITCHING CONVERTER CIRCUIT AND MULTI-LEVEL SWITCHING CONVERSION METHOD

CROSS REFERENCE

The present invention claims priority to U.S. 63/505,064 filed on May 31, 2023.

BACKGROUND OF THE INVENTION

Field of Invention

The present invention relates to a multi-level switching converter circuit and a multi-level switching conversion method, particularly, it relates to such multi-level switching converter circuit and multi-level switching conversion method with a valley current mode control.

Description of Related Art

FIG. 1 shows a prior art three-level buck converter 10 of "Three-level Buck Converter for Envelope Tracking in RF Power Amplifiers" IEEE Applied Power Electronics Conference and Exposition, 2005. A three-level buck converter 10 is used to convert an input voltage V1 to an output voltage V2. The three-level buck converter 10 is applied for tracking applications such as envelope-tracking in radio frequency power amplifiers. The three-level buck converter 10 shown in FIG. 1 figures out the benefits of the three-level Buck converter such as low voltage stress to components and lower ripple current compared to a traditional two-level Buck converter.

U.S. Pat. No. 9,866,113 shows a prior art DC-DC converter. The prior art DC-DC converter discloses a three-level buck converter operating with a peak current mode control and a voltage sense circuit to adjust duty cycle timing for balancing a flying capacitor voltage $V_{CFLY}$ of a flying capacitor, to convert an input voltage $V_{IN}$ to an output voltage $V_{OUT}$.

"A 50 MHz 5V 3 W 90% Efficiency 3-Level Buck Converter with Real-Time Calibration and Wide Output Range for Fast-DVS in 65 nm CMOS" IEEE Symposium on VLSI Circuits, 15-17 Jun. 2016 shows a prior art 3-Level buck converter.

Conventional three-level buck converters, such as those disclosed in IEEE Applied Power Electronics Conference and Exposition, 2005, U.S. Pat. No. 9,866,113, and IEEE Symposium on VLSI Circuits 2016 offer reduced voltage stress and lower ripple current compared to traditional two-level Buck converters. However, these designs require an additional sensing circuit for sensing the voltage across the flying capacitor and an additional compensation control loop for balancing the voltage across the flying capacitor, introducing complexity and potential inefficiencies.

In view of the above, to overcome the drawbacks in the prior art, the present invention proposes a multi-level switching converter circuit and a multi-level switching conversion method with a valley current mode control.

SUMMARY OF THE INVENTION

From one perspective, the present invention provides a multi-level switching converter circuit configured to convert a first voltage to a second voltage or convert the second voltage to the first voltage, the multi-level switching converter comprising: a power stage circuit, which is coupled between the first voltage and the second voltage, and includes a plurality of power switches for switching a flying capacitor and an inductor; and a conversion control circuit, which is configured to generate a first control signal for periodically operating a first portion of the plurality of power switches and a second control signal for periodically operating a second portion of the plurality of power switches; wherein through a valley current mode control, the conversion control circuit generates a first ramp signal to determine a first duty ratio of the first control signal, and generates a second ramp signal to determine a second duty ratio of the second control signal, thereby a switching node connected to one end of the inductor is switched between two of k levels of voltages, such that the first voltage or the second voltage is regulated to a predetermined target level, and a flying capacitor voltage across the flying capacitor is regulated and balanced at one (k−1)th of the first voltage; wherein k is an integer equal to or greater than 3, and the k levels of voltages include the first voltage, a ground potential and at least one divided voltage of the first voltage.

From another perspective, the present invention provides a multi-level switching conversion method for converting a first voltage to a second voltage or convert the second voltage to the first voltage, the multi-level switching conversion method comprising: switching a flying capacitor and an inductor by a plurality of power switches of a power stage circuit coupled between the first voltage and the second voltage; generating a first control signal for periodically operating a first portion of the plurality of power switches of the power stage circuit and a second control signal for periodically operating a second portion of the plurality of power switches of the power stage circuit; generating a first ramp signal to determine a first duty ratio of the first control signal, and generating a second ramp signal to determine a second duty ratio of the second control signal through a valley current mode control, thereby a switching node connected to one end of the inductor is switched between two of k levels of voltages, such that the first voltage or the second voltage is regulated to a predetermined target level, and a flying capacitor voltage across the flying capacitor is regulated and balanced at one (k−1)th of the first voltage; wherein k is an integer equal to or greater than 3, and the k levels of voltages include the first voltage, a ground potential and at least one divided voltage of the first voltage.

In one embodiment, the first duty ratio is determined according to the first ramp signal, a current sensing signal and a feedback related signal, wherein a starting time point of a pulse of the first control signal determines a first valley of the current sensing signal, thereby achieving the valley current mode control; wherein the second duty ratio is determined according to the second ramp signal, the current sensing signal and the feedback related signal, wherein a starting time point of a pulse of the second control signal determines a second valley of the current sensing signal, thereby achieving the valley current mode control; wherein the pulse of the first control signal has the first duty ratio, wherein the pulse of the second control signal has the second duty ratio, wherein the current sensing signal is positively related to an inductor current flowing through the inductor, and the feedback related signal is related to a feedback signal which is related to the second voltage or the first voltage.

In one embodiment, a first signal group includes the first ramp signal, the current sensing signal and the feedback related signal, and a first one and a second one of the first signal group are superimposed and then compared with a third one of the first signal group to determine the starting time point of the pulse of the first control signal, and an end time point of the pulse of the first control signal is triggered by a first clock signal, wherein the first one, the second one and the third one of the first signal group are different between each other; wherein a second group of signals includes the second ramp signal, the current sensing signal and the feedback related signal, and a first one and a second one of the second group of signals are superimposed and then compared with a third one of the second group of signals to determine the starting time point of the pulse of the second control signal, and an end time point of the pulse of the second control signal is triggered by a second clock signal, wherein the first one, the second one and the third one of the second group of signals are different between each other.

In one embodiment, the first one, the second one and the third one of the first signal group are corresponded to the feedback related signal, the first ramp signal and the current sensing signal respectively; wherein the first one, the second one and the third one of the second ramp signal, the current sensing signal and the feedback related signal are corresponded to the feedback related signal, the second ramp signal and the current sensing signal respectively.

In one embodiment, the first ramp signal is synchronized by the first clock signal, and the second ramp signal is synchronized by the second clock signal.

In one embodiment, the first clock signal and the second clock signal have a same fixed frequency.

In one embodiment, a phase-shift between the first ramp signal and the second ramp signal is 360 divided by (k-1) degrees.

In one embodiment, through the valley current mode control, a conductive period of the pulse of the first control signal is inversely correlated to the flying capacitor voltage, and a conductive period of the pulse of the second control signal is positively correlated to the flying capacitor voltage, as thus, the flying capacitor voltage is balanced.

In one embodiment, the current sensing signal is obtained by coupling a DC resistance current sense circuit to the inductor.

In one embodiment, the first portion of the plurality of power switches includes a first switch and a second switch, and the second portion of the plurality of power switches includes a third switch and a fourth switch; wherein the first switch is coupled between the first voltage and a first end of the flying capacitor, the second switch is coupled between a second end of the flying capacitor and the ground potential, the third switch is coupled between the first end of the flying capacitor and the switching node, and the fourth switch is coupled between the second end of the flying capacitor and the switching node; wherein the first control signal operates the first switch, an inverted signal of the first control signal operates the second switch, the second control signal operates the third switch and an inverted signal of the second control signal operates the fourth switch; wherein k is 3, and the k levels of voltages include the first voltage, the ground potential and one half of the first voltage.

In one embodiment, the conversion control circuit generates the first control signal and the second control signal not according to a voltage sensing signal, wherein the voltage sensing signal is generated by sensing the flying capacitor voltage.

From another perspective, the present invention provides a multi-level switching converter circuit configured to convert a first voltage to a second voltage or convert the second voltage to the first voltage, the multi-level switching converter comprising: a first power stage circuit, which is coupled between the first voltage and the second voltage, and includes a plurality of first power switches for switching a first flying capacitor and a first inductor; a second power stage circuit, which is coupled between the first voltage and the second voltage, and includes a plurality of second power switches for switching a second flying capacitor and a second inductor; and a conversion control circuit, which is configured to generate a first control signal, a second control signal, a third control signal and a fourth control signal, wherein the first control signal is for operating a first portion of the plurality of first power switches, the second control signal is for operating a second portion of the plurality of first power switches, the third control signal is for operating a first portion of the plurality of second power switches, and the fourth control signal is for operating a second portion of the plurality of second power switches; wherein through a first valley current mode control, the conversion control circuit generates a first ramp signal to determine a first duty ratio of the first control signal, and generates a second ramp signal to determine a second duty ratio of the second control signal, thereby a first switching node connected to one end of the first inductor is switched between two of k levels of voltages, such that the first voltage or the second voltage is regulated to a predetermined target level, and a first flying capacitor voltage across the first flying capacitor is regulated and balanced at one (k-1)th of the first voltage; wherein through a second valley current mode control, the conversion control circuit generates a third ramp signal to determine a third duty ratio of the third control signal, and generates a fourth ramp signal to determine a fourth duty ratio of the fourth control signal, thereby a second switching node connected to one end of the second inductor is switched between two of p levels of voltages, such that the first voltage or the second voltage is regulated to the predetermined target level, and a second flying capacitor voltage across the second flying capacitor is regulated and balanced at one (p-1)th of the first voltage; wherein k and p are both integers equal to or greater than 3, and the k levels of voltages include the first voltage, a ground potential and at least one divided voltage of the first voltage, and the p levels of voltages include the first voltage, a ground potential and at least one divided voltage of the first voltage.

In one embodiment, the first duty ratio is determined according to the first ramp signal, a first current sensing signal and a feedback related signal, wherein a starting time point of a pulse of the first control signal determines a first valley of the first current sensing signal, thereby achieving the first valley current mode control; wherein the second duty ratio is determined according to the second ramp signal, the first current sensing signal and the feedback related signal, wherein a starting time point of a pulse of the second control signal determines a second valley of the first current sensing signal, thereby achieving the first valley current mode control; wherein the third duty ratio is determined according to the third ramp signal, a second current sensing signal and the feedback related signal, wherein a starting time point of a pulse of the third control signal determines a third valley of the second current sensing signal, thereby achieving the second valley current mode control; wherein the fourth duty ratio is determined according to the fourth ramp signal, the second current sensing signal and the feedback related signal, wherein a starting time point of a pulse of the fourth control signal determines a fourth valley of the second current sensing signal, thereby achieving the second valley current mode control; wherein the pulse of the first control signal has the first duty ratio, wherein the pulse of the second control signal has the second duty ratio, wherein the first current sensing signal is positively related to an inductor current flowing through the first inductor, and the feedback related signal is related to a feedback signal which is related to the second voltage or the first voltage; wherein the pulse of the third control signal has the third duty ratio, wherein the pulse of the fourth control signal has the fourth duty ratio, wherein the second current sensing signal is positively related to an inductor current flowing through the second inductor.

In one embodiment, a first signal group includes the first ramp signal, the first current sensing signal and the feedback related signal, and a first one and a second one of the first signal group are superimposed and then compared with a third one of the first signal group to determine the starting time point of the pulse of the first control signal, and an end time point of the pulse of the first control signal is triggered by a first clock signal, wherein the first one, the second one and the third one of the first signal group are different between each other; wherein a second group of signals includes the second ramp signal, the first current sensing signal and the feedback related signal, and a first one and a second one of the second group of signals are superimposed and then compared with a third one of the second group of signals to determine the starting time point of the pulse of the second control signal, and an end time point of the pulse of the second control signal is triggered by a second clock signal, wherein the first one, the second one and the third one of the second group of signals are different between each other; wherein a third signal group includes the third ramp signal, the second current sensing signal and the feedback related signal, and a first one and a second one of the third signal group are superimposed and then compared with a third one of the first signal group to determine the starting time point of the pulse of the third control signal, and an end time point of the pulse of the third control signal is triggered by a third clock signal, wherein the first one, the second one and the third one of the third signal group are different between each other; wherein a fourth group of signals includes the fourth ramp signal, the second current sensing signal and the feedback related signal, and a first one and a second one of the fourth group of signals are superimposed and then compared with a third one of the fourth group of signals to determine the starting time point of the pulse of the fourth control signal, and an end time point of the pulse of the fourth control signal is triggered by a fourth clock signal, wherein the first one, the second one and the third one of the second group of signals are different between each other.

In one embodiment, the first one, the second one and the third one of the first signal group are corresponded to the feedback related signal, the first ramp signal and the first current sensing signal respectively; wherein the first one, the second one and the third one of the second signal group are corresponded to the feedback related signal, the second ramp signal and the first current sensing signal respectively; wherein the first one, the second one and the third one of the third signal group are corresponded to the feedback related signal, the third ramp signal and the second current sensing signal respectively; wherein the first one, the second one and the third one of the fourth signal group are corresponded to the feedback related signal, the fourth ramp signal and the second current sensing signal respectively.

In one embodiment, the first ramp signal is synchronized by the first clock signal, and the second ramp signal is synchronized by the second clock signal; wherein the third ramp signal and the fourth ramp signal are synchronized by the third clock signal and the fourth clock signal respectively.

In one embodiment, the first clock signal, the second clock signal, the third clock signal and the fourth clock signal have a same fixed frequency.

In one embodiment, a phase-shift between the first ramp signal and the second ramp signal is 360 divided by (k−1) degrees; and/or wherein a phase-shift between the third ramp signal and the fourth ramp signal is 360 divided by (p−1) degrees.

In one embodiment, through the first valley current mode control, a conductive period of the pulse of the first control signal is inversely correlated to the first flying capacitor voltage, and a conductive period of the pulse of the second control signal is positively correlated to the first flying capacitor voltage, as thus, the first flying capacitor voltage is balanced; wherein through the second valley current mode control, a conductive period of the pulse of the third control signal is inversely correlated to the second flying capacitor voltage, and a conductive period of the pulse of the fourth control signal is positively correlated to the second flying capacitor voltage, as thus, the second flying capacitor voltage is balanced.

In one embodiment, the first current sensing signal is obtained by coupling a first DC resistance current sense circuit to the first inductor; and/or wherein the second current sensing signal is obtained by coupling a second DC resistance current sense circuit to the second inductor.

In one embodiment, the first portion of the plurality of first power switches includes a first switch and a second switch, and the second portion of the plurality of first power switches includes a third switch and a fourth switch; wherein the first switch is coupled between the first voltage and a first end of the first flying capacitor, the second switch is coupled between a second end of the first flying capacitor and the ground potential, the third switch is coupled between the first end of the first flying capacitor and the switching node, and the fourth switch is coupled between the second end of the first flying capacitor and the switching node; wherein the first control signal operates the first switch, an inverted signal of the first control signal operates the second switch, the second control signal operates the third switch and an inverted signal of the second control signal operates the fourth switch; wherein k is 3, and the k levels of voltages include the first voltage, the ground potential and one half of the first voltage; wherein the first portion of the plurality of second power switches includes a fifth switch and a sixth switch, and the second portion of the plurality of second power switches includes a seventh switch and an eighth switch; wherein the fifth switch is coupled between the first voltage and a first end of the second flying capacitor, the sixth switch is coupled between a second end of the second flying capacitor and the ground potential, the seventh switch is coupled between the first end of the second flying capacitor and the switching node, and the eighth switch is coupled between the second end of the second flying capacitor and the switching node; wherein the third control signal operates the fifth switch, an inverted signal of the third control signal operates the sixth switch, the fourth control signal operates the seventh switch and an inverted signal of the fourth control signal operates the eighth switch; wherein p is 3, and the p levels of voltages include the first voltage, the ground potential and one half of the first voltage.

Advantages of the present invention include that:
1. No need additional sensing circuit for flying capacitor voltage;
2. No need additional flying capacitor voltage balancing compensation control loop;
3. Simple control loop and compensator design;

4. Flying capacitor voltage balancing automatically;
5. Fast transient response; and
6. Shorter minimum on-time compared to the peak current mode control.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
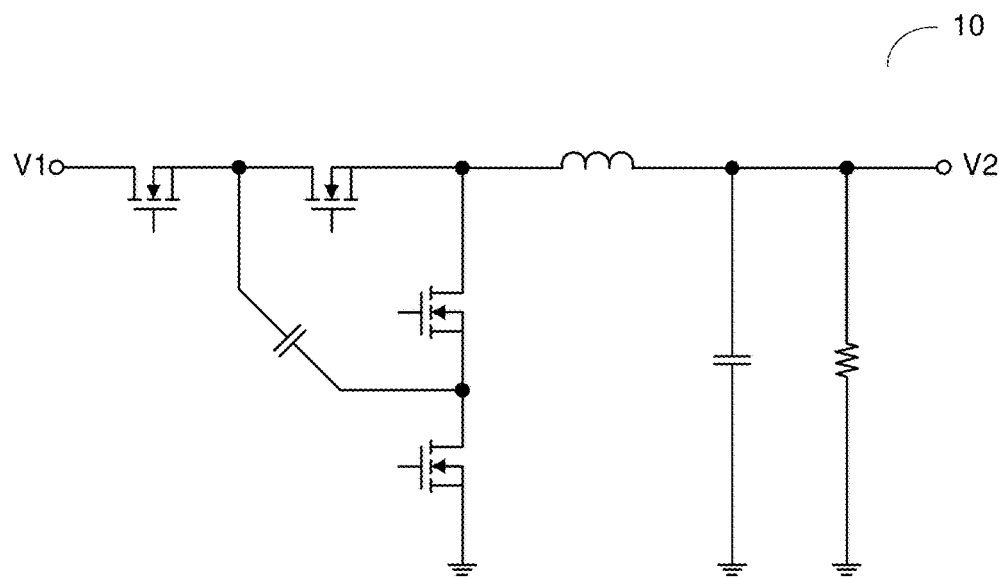
FIG. 1 shows a prior art three-level buck converter.
Figure 2:
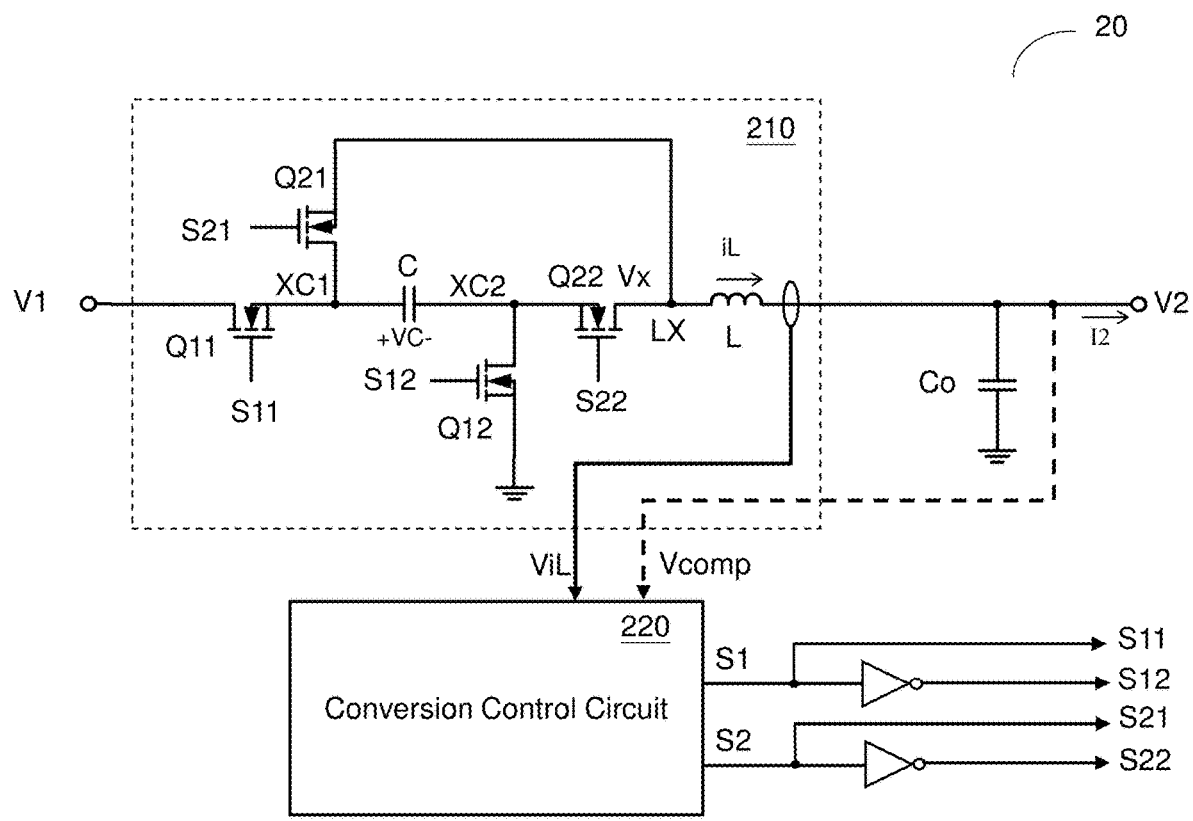
FIG. 2 shows a schematic diagram of a multi-level switching converter circuit according to an embodiment of the present invention.

FIG. 2 shows a schematic diagram of a multi-level switching converter circuit according to an embodiment of the present invention. As shown in FIG. 2, a multi-level switching converter circuit 20 is configured to operably convert a first voltage to a second voltage V2 or convert the second voltage V2 to the first voltage V1. The multi-level switching converter 20 includes a power stage circuit 210 and a conversion control circuit 220.

The power stage circuit 210 is coupled between the first voltage V1 and the second voltage V2, and includes a plurality of power switches (Q11, Q12, Q21 and Q22) for switching a flying capacitor C and an inductor L. The conversion control circuit 220 is configured to operably generate a first control signal S1 for operating a first portion of the plurality of power switches (Q11, Q12, Q21 and Q22) and a second control signal S2 for operating a second portion of the plurality of power switches. Specifically, in this embodiment, "the first portion" refers to the first switch (Q11) and the second switch (Q12), and "the second portion" refers to the third switch Q21 and the fourth switch Q22.

Note that, in this embodiment, the first control signal S1 is used to generate a control signal S11 for operating the first switch Q11 and a control signal S12 for operating the second switch Q12, wherein the control signal S11 directly corresponds to the first control signal S1 and the control signal S12 is an inverted signal of the first control signal S1, that is, the control signals S11 and S12 are both generated from the first control signal S1, and the first switch Q11 and the second switch Q12 (the first portion of the plurality of power switches) operate according to the first control signal S1.

Note that, the second control signal S2 is used to generate a control signal S21 for operating the third switch Q21 and a control signal S22 for operating the fourth switch Q22, wherein the control signal S21 directly corresponds to the second control signal S2 and the control signal S22 is an inverted signal of the second control signal S2, that is, the control signals S21 and S22 are both generated from the second control signal S2, and the third switch Q21 and the fourth switch Q22 (the second portion of the plurality of power switches) operate according to the second control signal S2.

Figure 3:
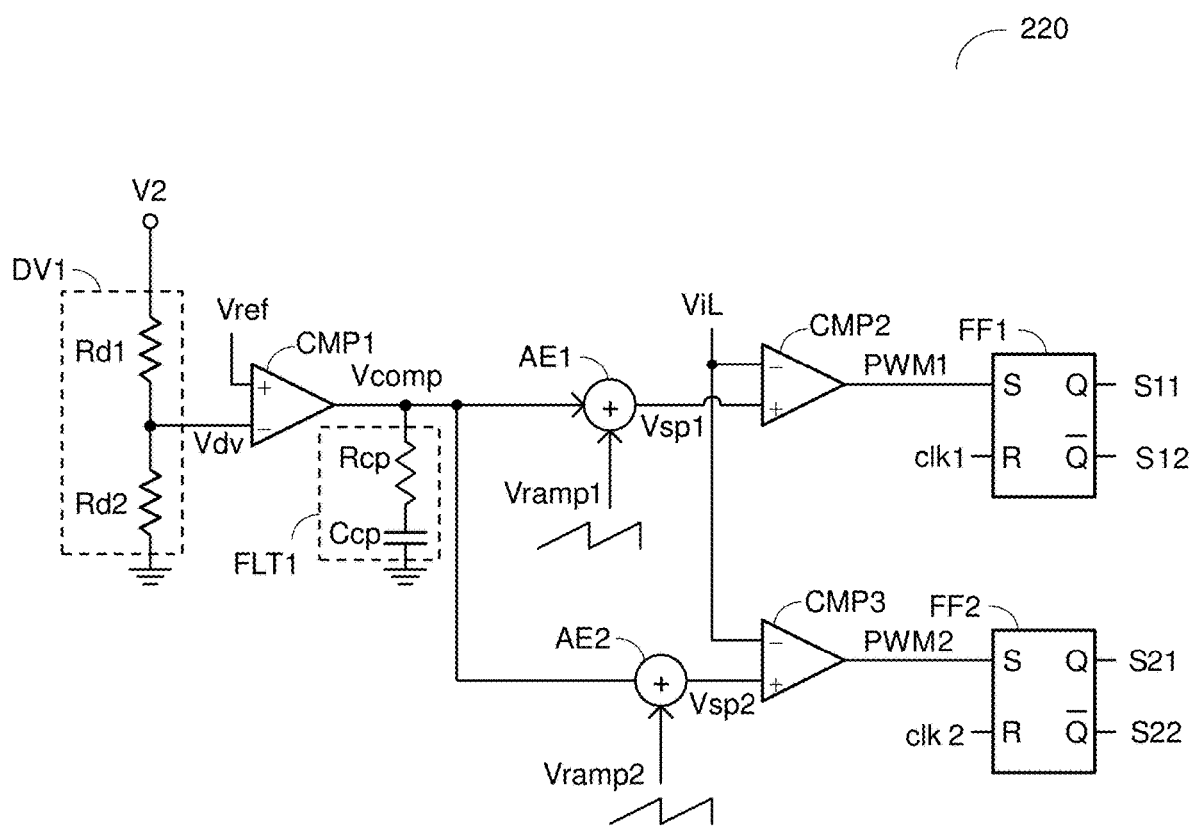
FIG. 3 shows a schematic diagram of a conversion control circuit of a multi-level switching converter circuit according to an embodiment of the present invention.

FIG. 3 shows a schematic diagram of a conversion control circuit 220 of the multi-level switching converter circuit 20 according to an embodiment of the present invention. As shown in FIG. 3, the conversion control circuit 220 includes a voltage divider DV1, a comparator CMP1, a filter FLT1, adders AE1 and AE2, comparators CMP2 and CMP3, and latch circuits FF1 and FF2. As an exemplary embodiment, the multi-level switching converter circuit 20 is configured to convert a first voltage V1 into a second voltage V2. The voltage divider DV1 includes resistors Rd1 and Rd2 connected in series to derive a divided voltage Vdv from the second voltage V2. The comparator CMP1 compares the divided voltage Vdv with a reference voltage Vref, to generate a feedback related signal Vcomp. In one embodiment, a filter FLT1 is employed to filter the feedback related signal Vcomp. The adder AE1 superimposes the feedback related signal Vcomp with a first ramp signal Vramp1 to generate a first superposition signal Vsp1. The adder AE2 superimposes the feedback related signal Vcomp with a second ramp signal Vramp2 to generate a second superposition signal Vsp2. The comparator CMP2 compares the first superposition signal Vsp1 with a current sensing signal ViL, to generate a first pulse width modulation signal PWM1. The comparator CMP3 compares the second superposition signal Vsp2 with the current sensing signal ViL, to generate a second pulse width modulation signal PWM2.

Note that, the relationships of superposition and comparison between the feedback related signal Vcomp, the ramp signal and the current sensing signal can be altered to generate an identical pulse width modulation signal. Specifically, in another embodiment, the adder AE1 superimposes the current sensing signal ViL with the first ramp signal Vramp1 to generate a first superposition signal Vsp1. The adder AE2 superimposes the current sensing signal ViL with the second ramp signal Vramp2 to generate a second superposition signal Vsp2. The comparator CMP2 compares the first superposition signal Vsp1 with the feedback related signal Vcomp, to generate a first pulse width modulation signal PWM1. The comparator CMP3 compares the second superposition signal Vsp2 with the feedback related signal Vcomp, to generate a second pulse width modulation signal PWM2. In further another embodiment, the adder AE1 superimposes the current sensing signal ViL with the feedback related signal Vcomp to generate a first superposition signal Vsp1. The adder superimposes the current sensing signal ViL with the AE2 feedback related signal Vcomp to generate a second superposition signal Vsp2. The CMP2 comparator compares the first superposition signal Vsp1 with the first ramp signal Vramp1, to generate a first pulse width modulation signal PWM1. The comparator CMP3 compares the second superposition signal Vsp2 with the second ramp signal Vramp2, to generate a second pulse width modulation signal PWM2.

The latch circuit FF1 receives the first pulse width modulation signal PWM1 and a first clock signal clk1 to generate the control signal S11 and the control signal S12, wherein the control signal S11 directly corresponds to the first control signal S1 and the control signal S12 is an inverted signal of the first control signal S1. The latch circuit FF2 receives the second pulse width modulation signal PWM2 and a second clock signal clk2 to generate the control signal S21 and the control signal S22, wherein the control signal S21 directly corresponds to the second control signal S2 and the control signal S22 is an inverted signal of the second control signal S2.

Referring to FIGS. 2 and 3, through a valley current mode control, the conversion control circuit 220 generates the first ramp signal Vramp1 to determine a first duty ratio of the first control signal S1, and generates a second ramp signal Vramp2 to determine a second duty ratio of the second control signal S2, thereby a switching node LX connected to one end of the inductor L is switched between two of k levels of voltages, such that the first voltage V1 or the second voltage V2 is regulated to a predetermined target level, and a flying capacitor voltage VC across the flying capacitor C is regulated and balanced at one (k−1)th of the first voltage V1, wherein k is an integer equal to or greater than 3, and the k levels of voltages include the first voltage V1, a ground potential and at least one divided voltage of the first voltage V1.

In one embodiment, the first duty ratio is determined according to the first ramp signal Vramp1, the current sensing signal ViL and a feedback related signal Vcomp, wherein a starting time point of a pulse of the first control signal S1 determines a first valley of the current sensing signal ViL, thereby achieving the valley current mode control. The second duty ratio is determined according to the second ramp signal Vramp2, the current sensing signal ViL and the feedback related signal Vcomp, wherein a starting time point of a pulse of the second control signal S2 determines a second valley of the current sensing signal ViL, thereby achieving the valley current mode control. The pulse of the first control signal S1 has the first duty ratio, wherein the pulse of the second control signal S2 has the second duty ratio, wherein the current sensing signal ViL is positively related to an inductor current iL flowing through the inductor L, and the feedback related signal Vcomp is related to a feedback signal which is related to the second voltage V2 when the first voltage V1 is converted to the second voltage V2, or the first voltage V1 when the second voltage V2 is converted to the first voltage V1.

The previously mentioned combinations concerning the relationships of superposition and comparison between the feedback-related signal Vcomp, the ramp signal, and the current sensing signal can also be comprehended from the perspective described below, for generating the two aforementioned PWM signals. In one embodiment, a first signal group includes the first ramp signal Vramp1, the current sensing signal ViL and the feedback related signal Vcomp, and a first one and a second one of the first signal group are superimposed and then compared with a third one of the first signal group to determine the starting time point of the pulse of the first control signal S1, and an end time point of the pulse of the first control signal S1 is triggered by the first clock signal clk1, wherein the first one, the second one and the third one of the first signal group are different between each other.

In one embodiment, a second group of signals includes the second ramp signal Vramp2, the current sensing signal ViL and the feedback related signal Vcomp, and a first one and a second one of the second group of signals are superimposed and then compared with a third one of the second group of signals to determine the starting time point of the pulse of the second control signal S2, and an end time point of the pulse of the second control signal S2 is triggered by the second clock signal clk2, wherein the first one, the second one and the third one of the second group of signals are different between each other.

In one embodiment, the first one, the second one and the third one of the first signal group are corresponded to the feedback related signal Vcomp, the first ramp signal Vramp1 and the current sensing signal ViL respectively.

In one embodiment, the first one, the second one and the third one of the second signal group are corresponded to the feedback related signal Vcomp, the second ramp signal Vramp2 and the current sensing signal ViL respectively.

In one embodiment, the first ramp signal Vramp1 is synchronized by the first clock signal clk1, and the second ramp signal Vramp2 is synchronized by the second clock signal clk2.

In one embodiment, the first clock signal clk1 and the second clock signal clk2 have a same fixed frequency.

In one embodiment, a phase-shift between the first ramp signal Vramp1 and the second ramp signal Vramp2 is 360 divided by (k−1) degrees.

In one embodiment, through the valley current mode control, a conductive period of the pulse of the first control signal S1 is inversely correlated to the flying capacitor voltage VC, and a conductive period of the pulse of the second control signal S2 is positively correlated to the flying capacitor voltage VC, as thus, the flying capacitor voltage VC is balanced in a steady state of a normal operation.

In one embodiment, the current sensing signal ViL is obtained by coupling a DC resistance (DCR) current sense circuit to the inductor L.

In one embodiment, the first portion of the plurality of power switches (Q11, Q12, Q21 and Q22) includes the first switch Q11 and the second switch Q12, and the second portion of the plurality of power switches (Q11, Q12, Q21 and Q22) includes the third switch Q21 and the fourth switch Q22; wherein the first switch Q11 is coupled between the first voltage V1 and a first end XC1 of the flying capacitor C, the second switch Q12 is coupled between a second end XC2 of the flying capacitor C and the ground potential, the third switch Q21 is coupled between the first end XC1 of the flying capacitor C and the switching node LX, and the fourth switch Q22 is coupled between the second end XC2 of the flying capacitor C and the switching node LX; wherein the first control signal S1 operates the first switch Q11, an inverted signal of the first control signal S1 operates the second switch Q12, the second control signal S2 operates the third switch Q21 and an inverted signal of the second control signal S2 operates the fourth switch Q22; wherein k is 3, and the k levels of voltages include the first voltage V1, the ground potential and one half of the first voltage V1.

Note that, according to the present invention, in one embodiment, the multi-level switching converter circuit 20 neither includes a circuit for sensing the flying capacitor voltage VC across the flying capacitor C, nor regulates and balances the flying capacitor C at one (k−1)th of the first voltage V1 in a steady state of a normal operation according to the sensed flying capacitor voltage VC. Instead, according to the present invention, in one embodiment, the flying capacitor C is regulated and balanced at one (k−1)th of the first voltage V1 through the valley current mode control with the first ramp signal Ramp1 and the second ramp signal Ramp2, therefore the multi-level switching converter circuit 20 does not necessitate an extra balance or calibration loop as the prior arts for balancing or calibrating the flying capacitor voltage VC according to a sensing signal of the flying capacitor voltage VC.

From another perspective, the conversion control circuit 220 generates the first control signal S1 and the second control signal S2 not according to a voltage sensing signal, wherein the voltage sensing signal is generated by sensing the flying capacitor voltage VC.

Figure 4:
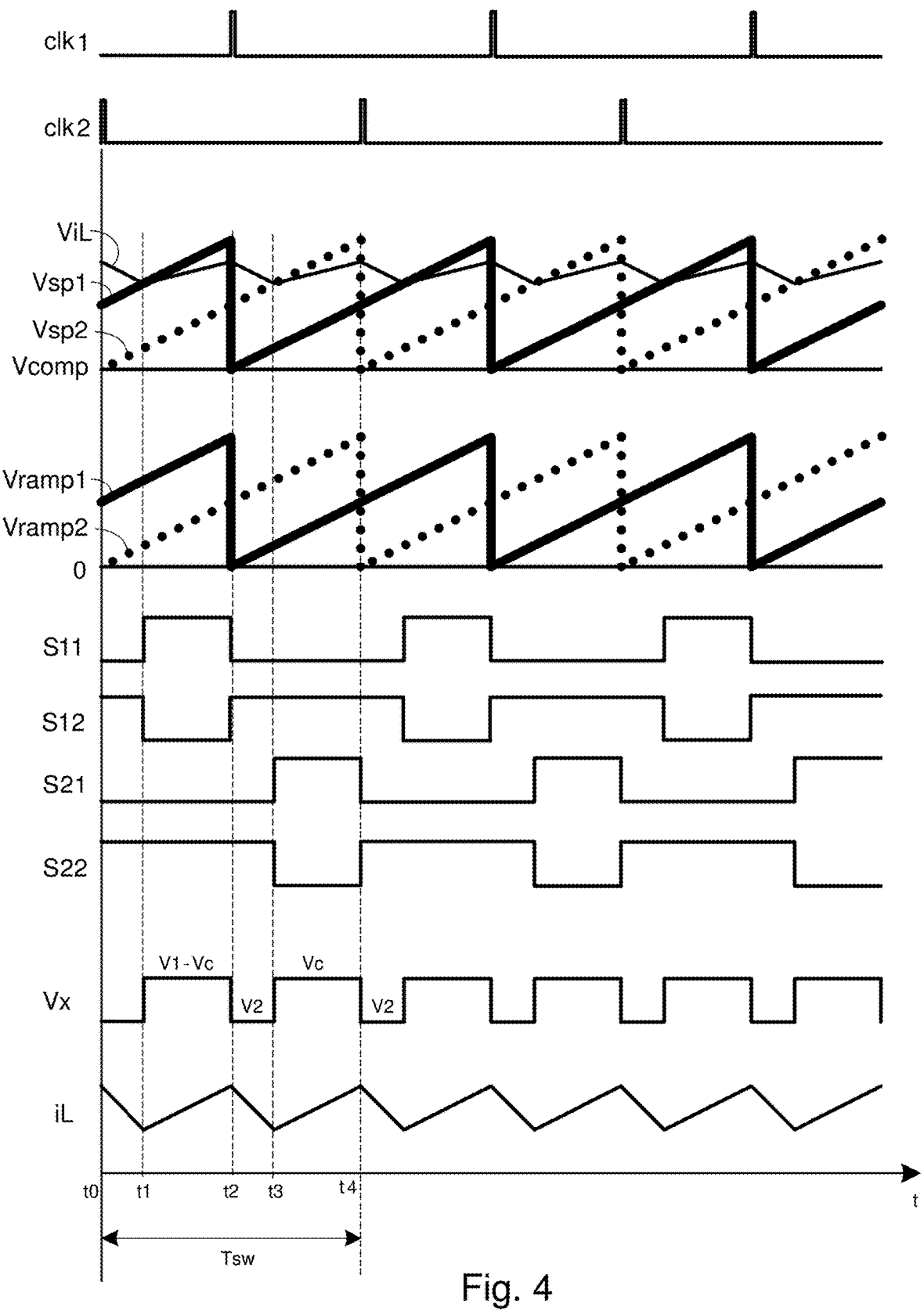
FIG. 4 shows signal waveforms of a multi-level switching converter circuit according to an embodiment of the present invention.

FIG. 4 shows signal waveforms of a multi-level switching converter circuit according to an embodiment of the present invention. As shown in FIG. 4, the first clock signal clk1 and the second clock signal clk2 are clock signals. In this embodiment, a phase difference between the first clock signal clk1 and the second clock signal clk2 is 180 degrees. Referring FIGS. 3 and 4, the conversion control circuit 220 generates the first ramp signal Vramp1 and the second ramp signal Vramp2 according to the first clock signal clk1 and the second clock signal clk2 respectively. For example, a capacitor is charged by a constant current, and is discharged periodically by the first clock signal (clk1), resulting in the generation of the first ramp signal (Vramp1). Similarly, the second ramp signal Ramp2 is also generated in a similar manner. The first superposition signal Vsp1 is equal to the first ramp signal Vramp1 plus the feedback related signal Vcomp; and the second superposition signal Vsp2 is equal to the second ramp signal Vramp2 plus the feedback related signal Vcomp.

Still referring to FIGS. 3 and 4, in this embodiment, from a time point t0 to a time point t1, the first switch Q11 is OFF, the second switch Q12 is ON, the third switch Q21 is OFF, the fourth switch Q22 is ON, causing and the current sensing signal ViL to decrease (i.e., the inductor current iL decreases). During the same period, the first superposition signal Vsp1 (including the first ramp signal Vramp1 and the feedback related signal Vcomp) increases, and the second superposition signal Vsp2 (including the second ramp signal Vramp2 the feedback related signal Vcomp) increases. At the time point t1, the first superimposed signal Vsp1 intersects the current sensing signal ViL, triggering a rising edge in the control signal S11 (equivalently, a falling edge in control signal S12). Consequently, the first switch Q11 is turned ON while the second switch Q12 is turned OFF). As a result, at the time point t1, the voltage at the switching node LX (Vx) transitions from the second voltage V2 to a voltage level equal to the first voltage V1 minus the voltage across the flying capacitor VC.

The transition of the voltage at the switching node LX (Vx) at time point t1 reverses the current sensing signal ViL to start increasing, and the first superposition signal Vsp1 and the second superposition signal Vsp2 keep increasing. At the time point t2, a pulse of the first clock signal clk1 triggers a falling edge of the control signal S11 (equivalently, a rising edge of the control signal S12). Consequently, the first switch Q11 is turned OFF, the second switch Q12 is turned ON, the third switch Q21 is turned OFF, the fourth switch Q22 is turned ON, with the first ramp signal Vramp1 being reset (meaning the first superimposed signal Vsp1 aligns with the level of the feedback-related signal Vcomp). As a result, at time t2, the voltage at the switching node LX (Vx) transitions from the previous voltage level equal to the first voltage V1 minus the flying capacitor voltage VC back to the second voltage V2.

The transition of the voltage at the switching node LX (Vx) at time point t2 reverses the current sensing signal ViL to start decreasing, and the second superposition signal Vsp2 and the first superposition signal Vsp1 keep increasing. At the time point t3, the second superposition signal Vsp2 intersects the current sensing signal ViL, triggering a rising edge of the control signal S21 (equivalently, a falling edge of the control signal S22). Consequently, the third switch Q21 is turned ON and the fourth switch Q22 is turned OFF. As a result, at the time point t3, a switching node voltage Vx of the switching node LX transitions from the second voltage V2 back to the flying capacitor voltage VC. Note that, in this embodiment, the flying capacitor voltage VC equals to the first voltage V1 minus the flying capacitor voltage VC, i.e., the first voltage V1 is equal to twice the flying capacitor voltage VC.

The transition of the voltage at the switching node LX (Vx) at time point t3 reverses the current sensing signal ViL to start increasing. Also from the time point t3, the first superposition signal Vsp1 and the second superposition signal Vsp2 keep increasing. At the time point t4, a pulse of the second clock signal clk2 triggers a falling edge of the control signal S21 (equivalently, a rising edge of the control signal S22). Consequently, the third switch Q21 turns OFF and the fourth switch Q22 turns ON, with the second ramp signal Vramp2 being reset (meaning the second superposition signal Vsp2 aligns with the level of the feedback related signal Vcomp). As a result, at the time point t4, the switching node voltage Vx of the switching node LX transitions from the flying capacitor voltage VC to the second voltage V2.

Figure 5:
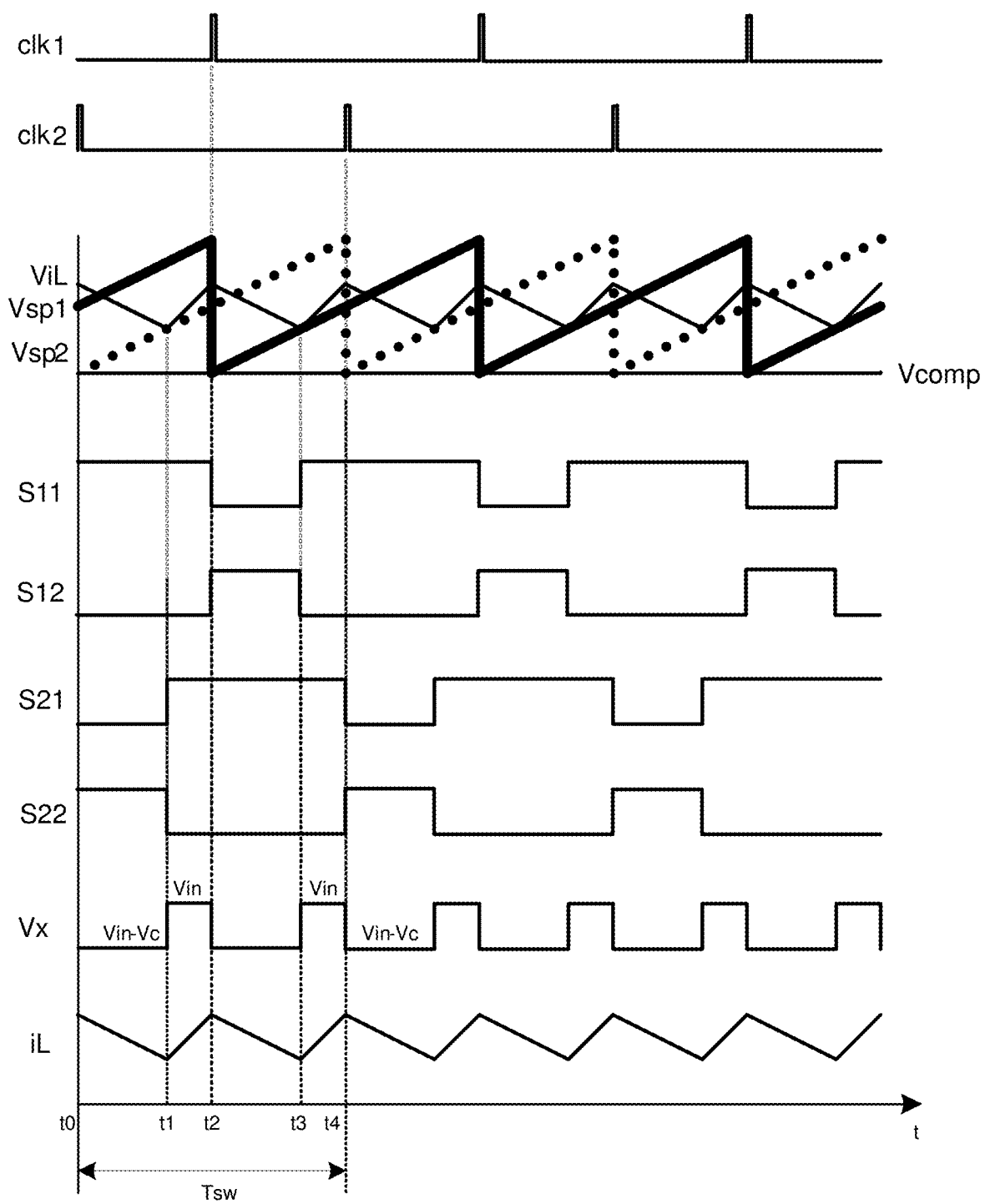
FIG. 5 shows signal waveforms of a multi-level switching converter circuit according to an embodiment of the present invention.

FIG. 5 shows signal waveforms of a multi-level switching converter circuit according to an embodiment of the present invention. The signal waveforms shown in FIG. 5 is similar to the signal waveforms shown in FIG. 4. A difference between FIG. 4 and FIG. 5 is that, a first duty ratio of the first control signal S1 (equal to a duty ratio of the control signal S11) and a second duty ratio of the second control signal S2 (equal to a duty ratio of the control signal S21) shown in FIG. 5 are both greater than 50%, while the corresponding duty ratios shown in FIG. 4 are less than 50%.

Figure 6:
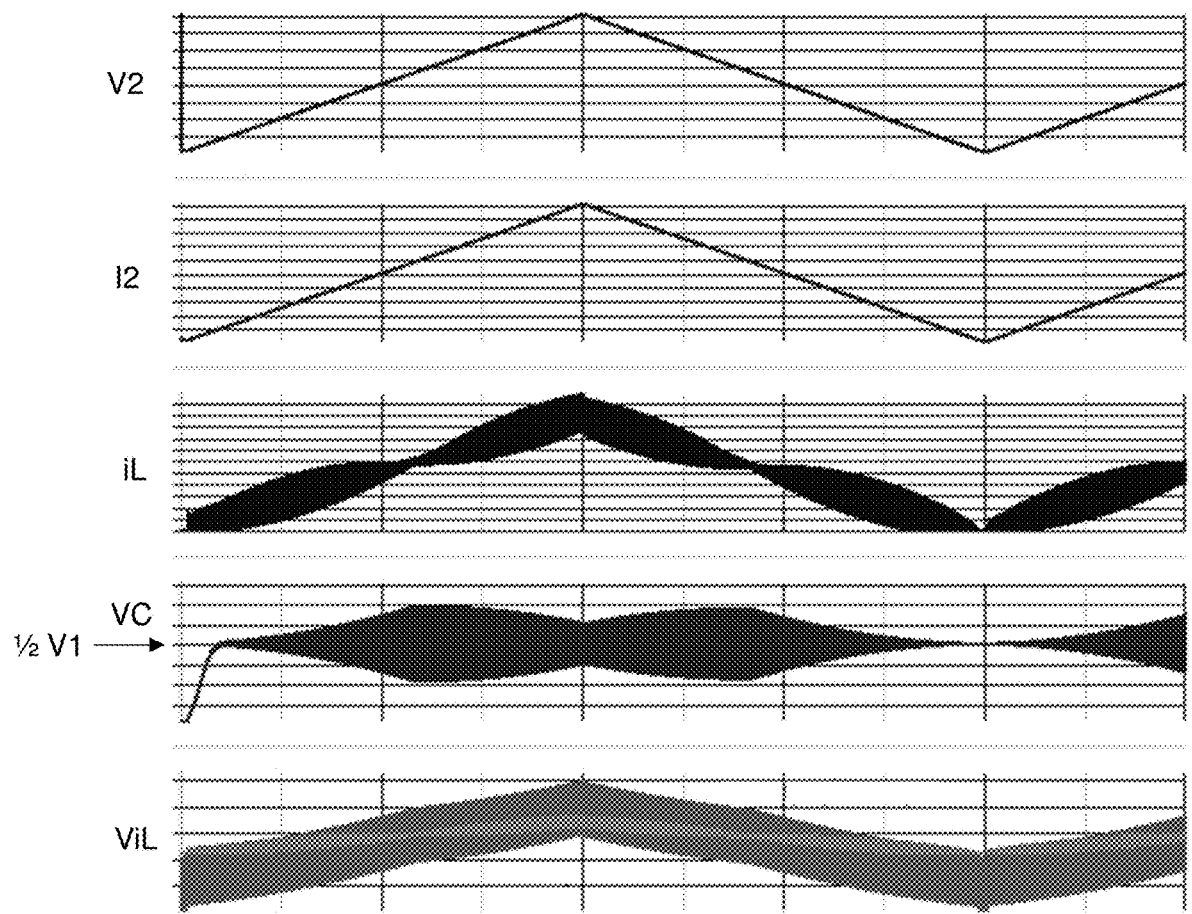
FIG. 6 shows signal waveforms of a multi-level switching converter circuit according to an embodiment of the present invention.

FIG. 6 shows signal waveforms of a multi-level switching converter circuit according to an embodiment of the present invention. For example, considering the first voltage V1 is set at 48V and an output load is set at 2 ohm, and the second voltage V2 ramps up and down between 0V and 40V according to the setting of the reference voltage Vref, an output current I2 and the inductor current iL changes responding to the second voltage V2. The multi-level switching converter circuit 20 is able to operate normally between conditions of the duty ratio less than 50% and the duty ratio larger than 50% for the first control signal S1 and the second control signal S2. An average level of the flying capacitor voltage VC can be balanced to half of the first voltage (i.e., V1/2) automatically through the valley current mode control.

Figure 7:
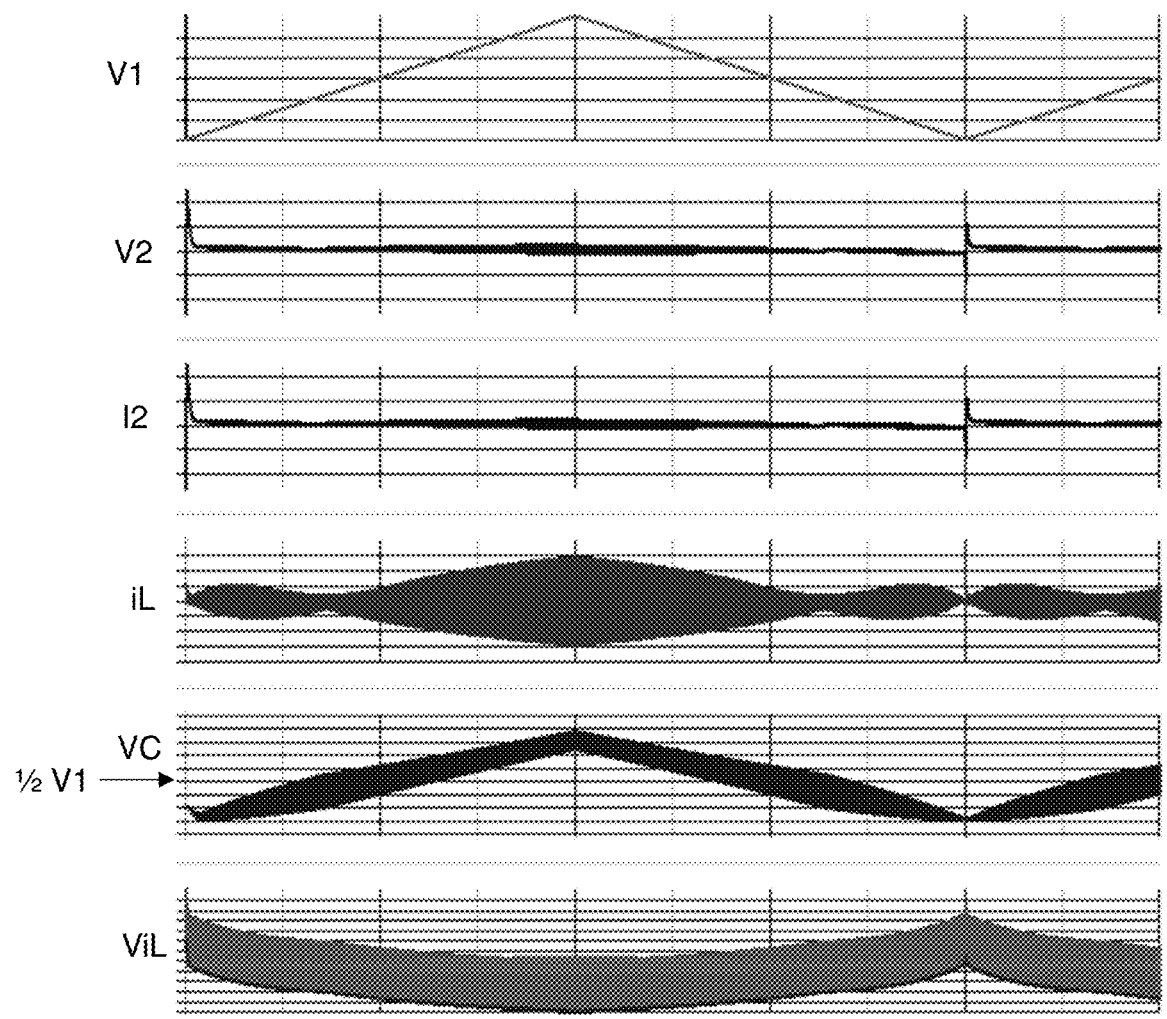
FIG. 7 shows signal waveforms of a multi-level switching converter circuit according to an embodiment of the present invention.

FIG. 7 shows signal waveforms of a multi-level switching converter circuit according to an embodiment of the present invention. For example, considering the reference voltage Vref is set at 20V and an output load is set at 1 ohm, the second voltage V2 can be regulated to 20V when the first voltage V1 ramps up and down between 20V and 80V. An average of the inductor current iL is equal to an output current I2 and an inductor current ripple is responding to the change of the first voltage V1. The multi-level switching converter circuit 20 is also able to operate normally between conditions of the duty ratio less than 50% and duty ratio larger than 50% for the first control signal S1 and the second control signal S2. An average level of the flying capacitor voltage VC can be balanced to half of the first voltage V1/2 automatically through the valley current mode control.

Figure 8:
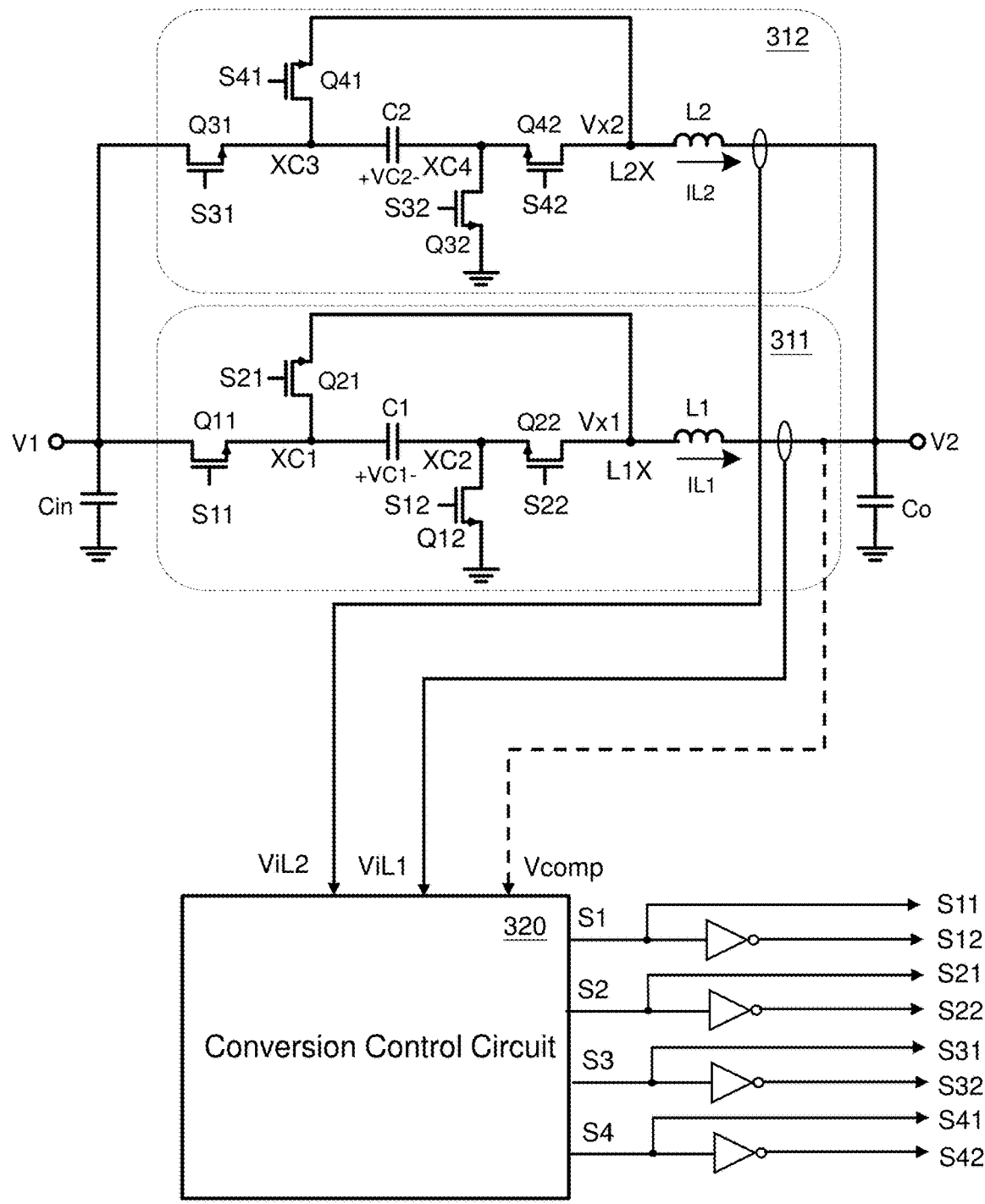
FIG. 8 shows a schematic diagram of a multi-level switching converter circuit according to an embodiment of the present invention.

FIG. 8 shows a schematic diagram of a multi-level switching converter circuit according to an embodiment of the present invention. As shown in FIG. 8, a multi-level switching converter circuit 30 is configured to operably convert a first voltage V1 to a second voltage V2 or convert the second voltage V2 to the first voltage V1. The multi-level switching converter 30 includes a first power stage circuit 311, a second power stage circuit 312 and a conversion control circuit 320.

The first power stage circuit 311 is coupled between the first voltage V1 and the second voltage V2, and includes a plurality of first power switches (Q11, Q12, Q21 and Q22) for switching a first flying capacitor C1 and a first inductor L1. The second power stage circuit 312 is coupled between the first voltage V1 and the second voltage V2, and includes a plurality of second power switches (Q31, Q32, Q41 and Q42) for switching a second flying capacitor C2 and a second inductor L2.

The conversion control circuit 320 is configured to operably generate a first control signal S1 for operating a first portion of the plurality of first power switches (Q11, Q12, Q21 and Q22), a second control signal S2 for operating a second portion of the plurality of first power switches a third control signal S3 for operating a first portion of the plurality of second power switches (Q31, Q32, Q41 and Q42), and a fourth control signal S4 for operating a second portion of the plurality of second power switches. Specifically, in this embodiment, "the first portion of the plurality of first power switches" refers to the first switch (Q11) and the second switch (Q12), "the second portion of the plurality of first power switches" refers to the third switch Q21 and the fourth switch Q22, while "the first portion of the plurality of second power switches" refers to the fifth switch Q31 and the sixth switch Q32, "the second portion of the plurality of second power switches" refers to the seventh switch Q41 and the eighth switch Q42. Note that, in this embodiment, the first control signal S1 is used to generate a control signal S11 for operating the first switch Q11 and a control signal S12 for operating the second switch Q12, wherein the control signal S11 directly corresponds to the first control signal S1 and the control signal S12 is an inverted signal of the first control signal S1; the second control signal S2 is used to generate a control signal S21 for operating the third switch Q21 and a control signal S22 for operating the fourth switch Q22, wherein the control signal S21 directly corresponds to the second control signal S2 and the control signal S22 is an inverted signal of the second control signal S2; the third control signal S3 is used to generate a control signal S31 for operating the fifth switch Q31 and a control signal S32 for operating the sixth switch Q32, wherein the control signal S31 directly corresponds to the third control signal S3 and the control signal S32 is an inverted signal of the third control signal S3; and the fourth control signal S4 is used to generate a control signal S41 for operating the seventh switch Q41 and a control signal S42 for operating the eighth switch Q42, wherein the control signal S41 directly corresponds to the fourth control signal S4 and the control signal S42 is an inverted signal of the second control signal S4.

Figure 9:
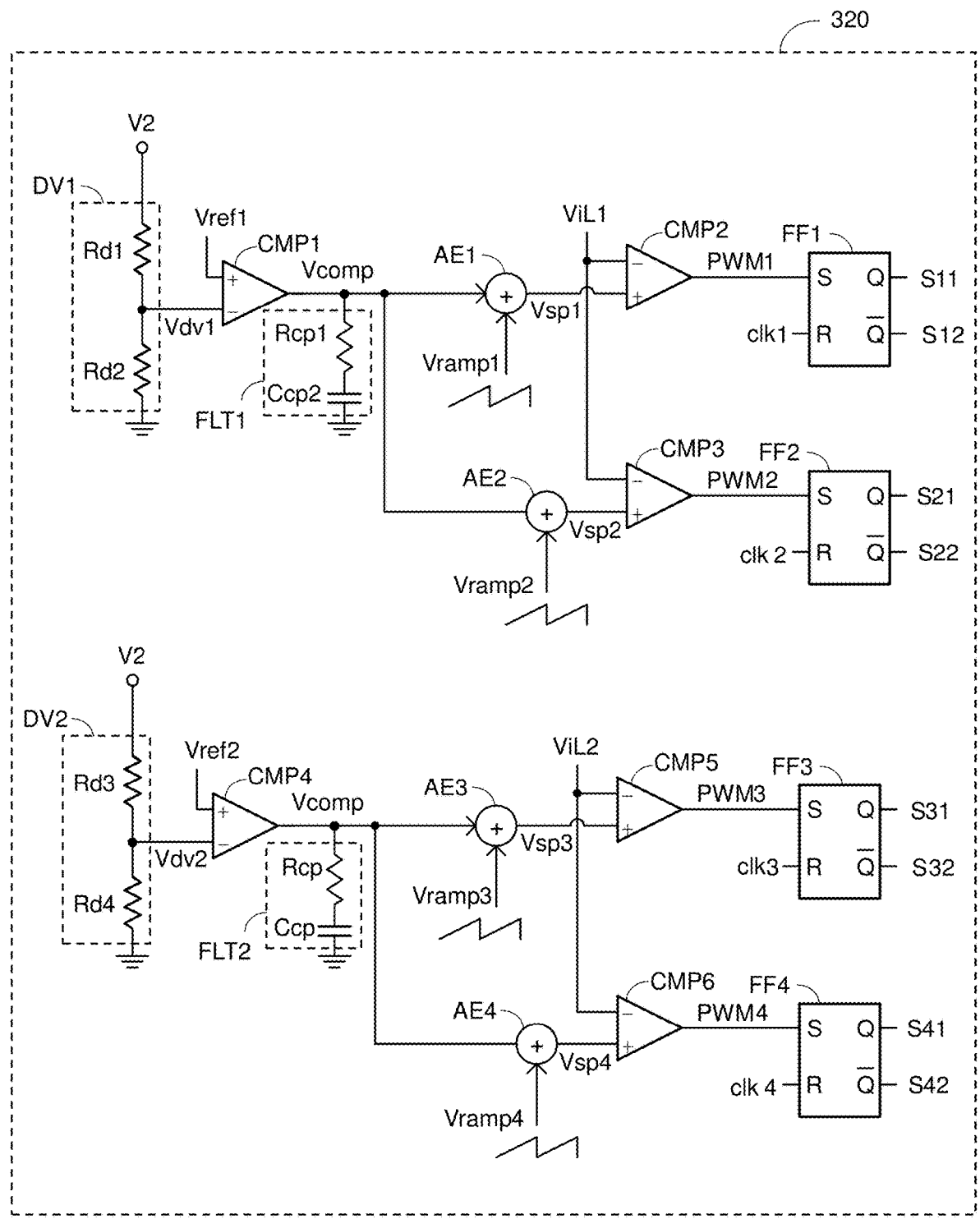
FIG. 9 shows a schematic diagram of a conversion control circuit of a multi-level switching converter circuit according to an embodiment of the present invention.

FIG. 9 shows a schematic diagram of a conversion control circuit 320 of the multi-level switching converter circuit 30 according to an embodiment of the present invention. As shown in FIG. 9, the conversion control circuit 320 includes voltage dividers DV1 and DV2, comparators CMP1, CMP2, CMP3, CMP4, CMP5 and CMP6, filters FLT1 and FLT2, adders AE1, AE2, AE3 and AE4, and latch circuits FF1, FF2, FF3 and FF4. As an exemplary embodiment, the multi-level switching converter circuit 30 is configured to convert a first voltage V1 into a second voltage V2. The voltage divider DV1 includes resistors Rd1 and Rd2 connected in series to derive a divided voltage Vdv from the second voltage V2. The comparator CMP1 compares the divided voltage Vdv1 with a reference voltage Vref1, to generate a feedback related signal Vcomp. In one embodiment, a filter FLT1 is employed to filter the feedback related signal Vcomp. The adder AE1 superimposes the feedback related signal Vcomp with a first ramp signal Vramp1 to generate a first superposition signal Vsp1. The adder AE2 superimposes the feedback related signal Vcomp with a second ramp signal Vramp2 to generate a second superposition signal Vsp2. The comparator CMP2 compares the first superposition signal Vsp1 with a current sensing signal ViL1, to generate a first pulse width modulation signal PWM1. The comparator CMP3 compares the second superposition signal Vsp2 with the current sensing signal ViL1, to generate a second pulse width modulation signal PWM2.

Note that, the relationships of superposition and comparison between the feedback related signal Vcomp, the ramp signal and the current sensing signal can be altered to generate an identical pulse width modulation signal. Specifically, in another embodiment the adder AE1 superimposes the current sensing signal ViL1 with the first ramp signal Vramp1 to generate a first superposition signal Vsp1. The adder AE2 superimposes the current sensing signal ViL2 with the second ramp signal Vramp2 to generate a second superposition signal Vsp2. The comparator CMP2 compares the first superposition signal Vsp1 with the feedback related signal Vcomp, to generate a first pulse width modulation signal PWM1. The comparator CMP3 compares the second superposition signal Vsp2 with the feedback related signal Vcomp, to generate a second pulse width modulation signal PWM2. In further another embodiment, the adder AE1 superimposes the current sensing signal ViL1 with the feedback related signal Vcomp to generate a first superposition signal Vsp1. The adder AE2 superimposes the current sensing signal ViL2 with the feedback related signal Vcomp to generate a second superposition signal Vsp2. The comparator CMP2 compares the first superposition signal Vsp1 with the first ramp signal Vramp1, to generate a first pulse width modulation signal PWM1. The comparator CMP3 compares the second superposition signal Vsp2 with the second ramp signal Vramp2, to generate a second pulse width modulation signal PWM2.

The latch circuit FF1 receives the first pulse width modulation signal PWM1 and a first clock signal clk1 to generate the control signal S11 and the control signal S12, wherein the control signal S11 directly corresponds to the first control signal S1 and the control signal S12 is an inverted signal of the first control signal S1. The latch circuit FF2 receives the second pulse width modulation signal PWM2 and a second clock signal clk2 to generate the control signal S21 and the control signal S22, wherein the control signal S21 directly corresponds to the second control signal S2 and the control signal S22 is an inverted signal of the second control signal S2.

The voltage divider DV2 includes resistors Rd3 and Rd4 connected in series to obtain a divided voltage Vdv2 of the second voltage V2. The comparator CMP4 compares the divided voltage Vdv2 with a reference voltage Vref2, to generate a feedback related signal Vcomp, wherein the filter FLT2 filters the feedback related signal Vcomp. The adder AE3 superimposes the feedback related signal Vcomp with a third ramp signal Vramp3 to generate a third superposition signal Vsp3. The adder AE4 superimposes the feedback related signal Vcomp with a fourth ramp signal Vramp4 to generate a fourth superposition signal Vsp4. The comparator CMP5 compares the third superposition signal Vsp3 with a current sensing signal ViL2, to generate a third pulse width modulation signal PWM3. The comparator CMP6 compares the fourth superposition signal Vsp4 with the current sensing signal ViL2, to generate a fourth pulse width modulation signal PWM4.

The latch circuit FF3 receives the third pulse width modulation signal PWM3 and a third clock signal clk3 to generate the control signal S31 and the control signal S32, wherein the control signal S31 directly corresponds to the third control signal S3 and the control signal S32 is an inverted signal of the third control signal S3. The latch circuit FF4 receives the fourth pulse width modulation signal PWM4 and a fourth clock signal clk4 to generate the control signal S41 and the control signal S42, wherein the control signal S41 directly corresponds to the fourth control signal S4 and the control signal S42 is an inverted signal of the fourth control signal S4.

Referring to FIGS. 8 and 9, through a first valley current mode control, the conversion control circuit 320 generates the first ramp signal Vramp1 to determine a first duty ratio of the first control signal S1, and generates a second ramp signal Vramp2 to determine a second duty ratio of the second control signal S2, thereby a switching node L1X connected to one end of the inductor L1 is switched between two of k levels of voltages, such that the first voltage V1 or the second voltage V2 is regulated to a predetermined target level, and a flying capacitor voltage VC1 across the flying capacitor C1 is regulated and balanced at one (k−1)th of the first voltage V1, wherein k is an integer equal to or greater than 3, and the k levels of voltages include the first voltage V1, the ground potential and at least one divided voltage of the first voltage V1.

Still referring to FIGS. 8 and 9, through a second valley current mode control, the conversion control circuit 320 generates the third ramp signal Vramp3 to determine a third duty ratio of the third control signal S3, and generates the fourth ramp signal Vramp4 to determine a fourth duty ratio of the fourth control signal S4, thereby a second switching node L2X connected to one end of the second inductor L2 is switched between two of p levels of voltages, such that the first voltage V1 or the second voltage V2 is regulated to the predetermined target level, and a second flying capacitor voltage VC2 across the second flying capacitor C2 is regulated and balanced at one (p−1)th of the first voltage, wherein p is an integer equal to or greater than 3, and the p levels of voltages include the first voltage V1, the ground potential and at least one divided voltage of the first voltage V1.

In one embodiment, the first duty ratio is determined according to the first ramp signal Vramp1, the first current sensing signal ViL1 and the feedback related signal Vcomp, wherein a starting time point of a pulse of the first control signal S1 determines a first valley of the first current sensing signal ViL1, thereby achieving the first valley current mode control. The second duty ratio is determined according to the second ramp signal Vramp2, the first current sensing signal ViL1 and the feedback related signal Vcomp, wherein a starting time point of a pulse of the second control signal S2 determines a second valley of the first current sensing signal ViL1, thereby achieving the first valley current mode control. The third duty ratio is determined according to the third ramp signal Vramp3, the second current sensing signal ViL2 and the feedback related signal Vcomp, wherein a starting time point of a pulse of the third control signal S3 determines a third valley of the second current sensing signal ViL2, thereby achieving the second valley current mode control. The fourth duty ratio is determined according to the fourth ramp signal Vramp4, the second current sensing signal ViL2 and the feedback related signal Vcomp, wherein a starting time point of a pulse of the fourth control signal S4 determines a fourth valley of the second current sensing signal ViL2, thereby achieving the second valley current mode control.

The pulse of the first control signal S1 has the first duty ratio, wherein the pulse of the second control signal S2 has the second duty ratio, wherein the first current sensing signal ViL1 is positively related to an inductor current flowing through the inductor L1, and the feedback related signal Vcomp is related to a feedback signal which is related to the second voltage V2 when the first voltage V1 is converted to the second voltage V2, or the first voltage V1 when the second voltage V2 is converted to the first voltage V1.

The pulse of the third control signal S3 has the third duty ratio, wherein the pulse of the fourth control signal S4 has the fourth duty ratio, wherein the second current sensing signal ViL2 is positively related to an inductor current flowing through the second inductor L2.

The previously mentioned combinations concerning the relationships of superposition and comparison between the feedback-related signal Vcomp, the ramp signal, and the current sensing signal can also be comprehended from the perspective described below, for generating the two aforementioned PWM signals. In one embodiment, a first signal group includes the first ramp signal Vramp1, the first current sensing signal ViL1 and the feedback related signal Vcomp, and a first one and a second one of the first signal group are superimposed and then compared with a third one of the first signal group to determine the starting time point of the pulse of the first control signal S1, and an end time point of the pulse of the first control signal S1 is triggered by the first clock signal clk1, wherein the first one, the second one and the third one of the first signal group are different between each other.

In one embodiment, a second group of signals includes the second ramp signal Vramp2, the first current sensing signal ViL1 and the feedback related signal Vcomp, and a first one and a second one of the second group of signals are superimposed and then compared with a third one of the second group of signals to determine the starting time point of the pulse of the second control signal S2, and an end time point of the pulse of the second control signal S2 is triggered by the second clock signal clk2, wherein the first one, the second one and the third one of the second group of signals are different between each other.

In one embodiment, a third signal group includes the third ramp signal Vramp3, the second current sensing signal ViL2 and the feedback related signal Vcomp, and a first one and a second one of the third signal group are superimposed and then compared with a third one of the third signal group to determine the starting time point of the pulse of the third control signal S3, and an end time point of the pulse of the third control signal S3 is triggered by a third clock signal clk3, wherein the first one, the second one and the third one of the third signal group are different between each other.

In one embodiment, a fourth group of signals includes the fourth ramp signal Vramp4, the second current sensing signal ViL2 and the feedback related signal Vcomp, and a first one and a second one of the fourth group of signals are superimposed and then compared with a third one of the fourth group of signals to determine the starting time point of the pulse of the fourth control signal S4, and an end time point of the pulse of the fourth control signal S4 is triggered by a fourth clock signal clk4, wherein the first one, the second one and the third one of the second group of signals are different between each other.

In one embodiment, the first one, the second one and the third one of the first signal group are corresponded to the feedback related signal Vcomp, the first ramp signal Vramp1 and the first current sensing signal ViL1 respectively.

In one embodiment, the first one, the second one and the third one of the second signal group are corresponded to the feedback related signal Vcomp, the second ramp signal Vramp2 and the first current sensing signal ViL1 respectively.

In one embodiment, the first one, the second one and the third one of the third signal group are corresponded to the feedback related signal Vcomp, the third ramp signal Vramp3 and the second current sensing signal ViL2 respectively.

In one embodiment, the first one, the second one and the third one of the fourth signal group are corresponded to the feedback related signal Vcomp, the fourth ramp signal Vramp4 and the second current sensing signal ViL2 respectively.

In one embodiment, the first ramp signal Vramp1 is synchronized by the first clock signal clk1, and the second ramp signal Vramp2 is synchronized by the second clock signal clk2.

In one embodiment, the third ramp signal Vramp3 and the fourth ramp signal Vramp4 are synchronized by the third clock signal clk3 and the fourth clock signal clk4 respectively.

In one embodiment, the first clock signal clk1, the second clock signal clk2, the third clock signal clk3 and the fourth clock signal clk4 have a same fixed frequency.

In one embodiment, a phase-shift between the first ramp signal Vramp1 and the second ramp signal Vramp2 is 360 divided by (k−1) degrees; and/or a phase-shift between the third ramp signal Vramp3 and the fourth ramp signal Vramp4 is 360 divided by (p−1) degrees.

In one embodiment, through the first valley current mode control, a conductive period of the pulse of the first control signal S1 is inversely correlated to the first flying capacitor voltage VC1, and a conductive period of the pulse of the second control signal S2 is positively correlated to the first flying capacitor voltage VC1, as thus, the first flying capacitor voltage VC1 is balanced in a steady state of a normal operation.

In one embodiment, through the second valley current mode control, a conductive period of the pulse of the third control signal S3 is inversely correlated to the second flying capacitor voltage VC2, and a conductive period of the pulse of the fourth control signal S4 is positively correlated to the second flying capacitor voltage VC2, as thus, the second flying capacitor voltage VC2 is balanced in the steady state of the normal operation.

In one embodiment, the first current sensing signal ViL1 is obtained by coupling a DC resistance (DCR) current sense circuit to the first inductor L1; and/or the second current sensing signal ViL2 is obtained by coupling a second DC resistance (DCR) current sense circuit to the second inductor L2.

In one embodiment, the first portion of the plurality of first power switches (Q11, Q12, Q21 and Q22) includes the first switch Q11 and the second switch Q12, and the second portion of the plurality of first power switches (Q11, Q12, Q21 and Q22) includes the third switch Q21 and the fourth switch Q22; wherein the first switch Q11 is coupled between the first voltage V1 and a first end XC1 of the first flying capacitor C1, the second switch Q12 is coupled between a second end XC2 of the first flying capacitor C1 and the ground potential, the third switch Q21 is coupled between the first end XC1 of the first flying capacitor C1 and the first switching node L1X, and the fourth switch Q22 is coupled between the second end XC2 of the first flying capacitor C1 and the first switching node L1X; wherein the first control signal S1 operates the first switch Q11, an inverted signal of the first control signal S1 operates the second switch Q12, the second control signal S2 operates the third switch Q21 and an inverted signal of the second control signal S2 operates the fourth switch Q22; wherein k is 3, and the k levels of voltages include the first voltage V1, the ground potential and one half of the first voltage V1.

In one embodiment, the first portion of the plurality of second power switches (Q31, Q32, Q41 and Q42) includes the fifth switch Q31 and the sixth switch Q32, and the second portion of the plurality of second power switches (Q31, Q32, Q41 and Q42) includes the seventh switch Q41 and the eighth switch Q42; wherein the fifth switch Q31 is coupled between the first voltage V1 and a first end XC3 of the second flying capacitor C2, the sixth switch Q32 is coupled between a second end XC4 of the second flying capacitor C2 and the ground potential, the seventh switch Q41 is coupled between the first end XC3 of the second flying capacitor C2 and the second switching node L2X, and the eighth switch Q42 is coupled between the second end XC4 of the second flying capacitor C2 and the second switching node L2X; wherein the third control signal S3 operates the fifth switch Q31, an inverted signal of the third control signal S3 operates the sixth switch Q32, the fourth control signal S4 operates the seventh switch Q41 and an inverted signal of the fourth control signal S4 operates the eighth switch Q42; wherein p is 3, and the p levels of voltages include the first voltage V1, the ground potential and one half of the first voltage V1.

From another perspective, the conversion control circuit 320 generates the first control signal S1 and the second control signal S2 not according to a first voltage sensing signal, wherein the first voltage sensing signal is generated by sensing the first flying capacitor voltage VC1.

In one embodiment, the conversion control circuit 320 generates the third control signal S3 and the fourth control signal S4 not according to a second voltage sensing signal, wherein the second voltage sensing signal is generated by sensing the second flying capacitor voltage VC2.

Figure 10:
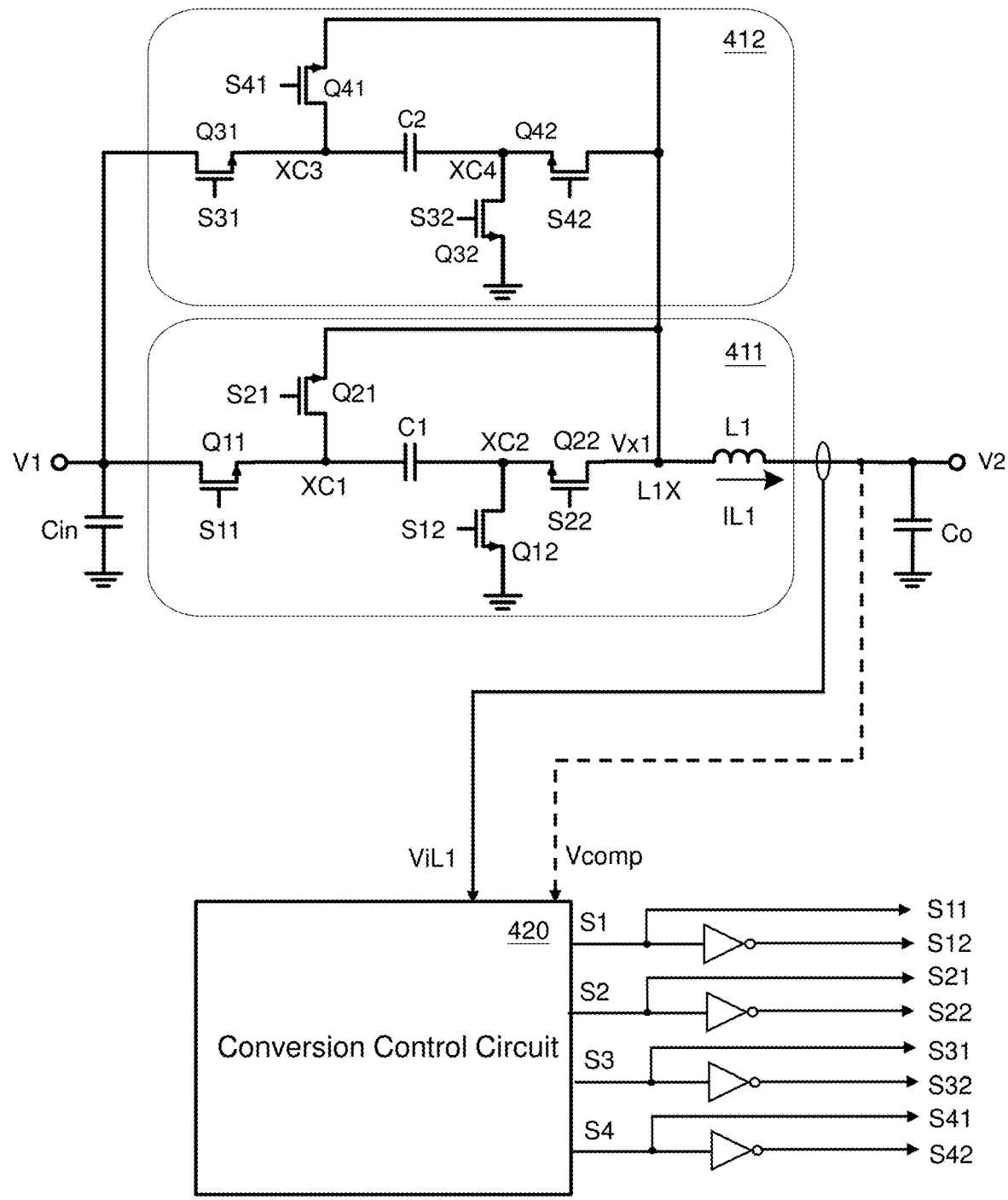
FIG. 10 shows a schematic diagram of a multi-level switching converter circuit according to an embodiment of the present invention.

FIG. 10 shows a schematic diagram of another multi-level switching converter circuit according to an embodiment of the present invention. FIG. 10 shows a multi-level switching converter circuit 40 similar to the multi-level switching converter circuit 30 shown in FIG. 8. A difference between the multi-level switching converter circuit 40 and the multi-level switching converter circuit 30 is that, in the multi-level switching converter circuit 40, a first power stage circuit 411 and a second power stage circuit 412 share the first inductor L1.

Figure 11:
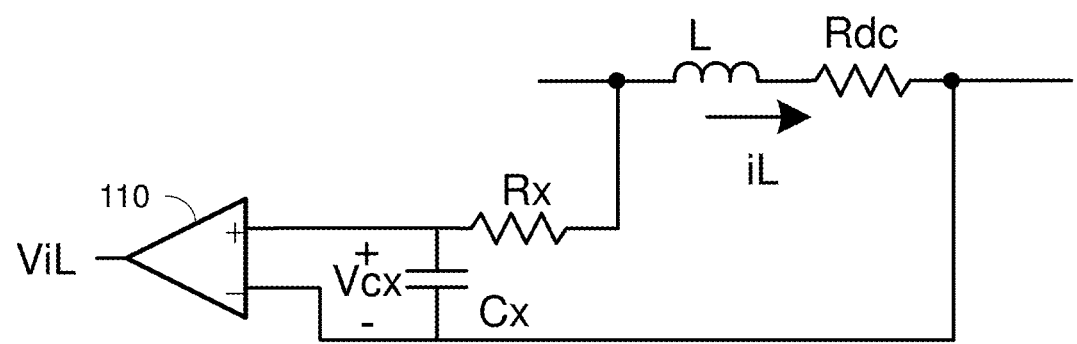
FIG. 11 shows a schematic diagram of a DCR current sense circuit according to an embodiment of the present invention.

FIG. 11 shows a schematic diagram of a DCR current sense circuit according to an embodiment of the present invention. As shown in FIG. 11, a DC resistance (DCR) current sense circuit is coupled to the inductor L. A sense resistor Rx and a sense capacitor Cx are connected in series and coupled with the inductor L. The inductor current iL can be sensed from the voltage of a sense capacitor Vcx, for example through an amplifier 110, when the time constant of the inductor L and a series DC resistance Rdc of the inductor and the time constant of the sense resistor Rx and the sense capacitor Cx are matched.

The benefit of the DCR current sensing method is to reduce power loss of current sense resistor. However, the sensed current signal (ViL) in FIG. 2 and FIG. 3 is not limited to the DCR current sensing method. The sensed current signal can be generated from a physical current sense resistor in series with the inductor, a current sense transformer, a Hall Effect sense device, the flying capacitor or one of the switches.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A multi-level switching converter circuit configured to convert a first voltage to a second voltage or convert the second voltage to the first voltage, the multi-level switching converter comprising:
   a power stage circuit, which is coupled between the first voltage and the second voltage, and includes a plurality of power switches for switching a flying capacitor and an inductor; and
   a conversion control circuit, which is configured to generate a first control signal for periodically operating a first portion of the plurality of power switches and a second control signal for periodically operating a second portion of the plurality of power switches;
   wherein through a valley current mode control, the conversion control circuit generates a first ramp signal to determine a first duty ratio of the first control signal, and generates a second ramp signal to determine a second duty ratio of the second control signal, thereby a switching node connected to one end of the inductor is switched between two of k levels of voltages, such that the first voltage or the second voltage is regulated to a predetermined target level, and a flying capacitor voltage across the flying capacitor is regulated and balanced at one (k−1)th of the first voltage;
   wherein k is an integer equal to or greater than 3, and the k levels of voltages include the first voltage, a ground potential and at least one divided voltage of the first voltage.

2. The multi-level switching converter circuit of claim 1, wherein the first duty ratio is determined according to the first ramp signal, a current sensing signal and a feedback related signal, wherein a starting time point of a pulse of the first control signal determines a first valley of the current sensing signal, thereby achieving the valley current mode control;
   wherein the second duty ratio is determined according to the second ramp signal, the current sensing signal and the feedback related signal, wherein a starting time point of a pulse of the second control signal determines a second valley of the current sensing signal, thereby achieving the valley current mode control;
   wherein the pulse of the first control signal has the first duty ratio, wherein the pulse of the second control signal has the second duty ratio, wherein the current sensing signal is positively related to an inductor current flowing through the inductor, and the feedback related signal is related to a feedback signal which is related to the second voltage or the first voltage.

3. The multi-level switching converter circuit of claim 2, wherein a first signal group includes the first ramp signal, the current sensing signal and the feedback related signal, and a first one and a second one of the first signal group are superimposed and then compared with a third one of the first signal group to determine the starting time point of the pulse of the first control signal, and an end time point of the pulse of the first control signal is triggered by a first clock signal, wherein the first one, the second one and the third one of the first signal group are different between each other;
   wherein a second group of signals includes the second ramp signal, the current sensing signal and the feedback related signal, and a first one and a second one of the second group of signals are superimposed and then compared with a third one of the second group of signals to determine the starting time point of the pulse of the second control signal, and an end time point of the pulse of the second control signal is triggered by a second clock signal, wherein the first one, the second one and the third one of the second group of signals are different between each other.

4. The multi-level switching converter circuit of claim 3, wherein the first one, the second one and the third one of the first signal group are corresponded to the feedback related signal, the first ramp signal and the current sensing signal respectively;
   wherein the first one, the second one and the third one of the second signal group are corresponded to the feedback related signal, the second ramp signal and the current sensing signal respectively.

5. The multi-level switching converter circuit of claim 3, wherein the first ramp signal is synchronized by the first clock signal, and the second ramp signal is synchronized by the second clock signal.

6. The multi-level switching converter circuit of claim 5, wherein the first clock signal and the second clock signal have a same fixed frequency.

7. The multi-level switching converter circuit of claim 6, wherein a phase-shift between the first ramp signal and the second ramp signal is 360 divided by (k−1) degrees.

8. The multi-level switching converter circuit of claim 2, wherein through the valley current mode control, a conductive period of the pulse of the first control signal is inversely correlated to the flying capacitor voltage, and a conductive period of the pulse of the second control signal is positively correlated to the flying capacitor voltage, as thus, the flying capacitor voltage is balanced.

9. The multi-level switching converter circuit of claim 1, wherein the current sensing signal is obtained by coupling a DC resistance (DCR) current sense circuit to the inductor.

10. The multi-level switching converter circuit of claim 9, wherein the first portion of the plurality of power switches includes a first switch and a second switch, and the second portion of the plurality of power switches includes a third switch and a fourth switch;
   wherein the first switch is coupled between the first voltage and a first end of the flying capacitor, the second switch is coupled between a second end of the flying capacitor and the ground potential, the third switch is coupled between the first end of the flying capacitor and the switching node, and the fourth switch is coupled between the second end of the flying capacitor and the switching node;
   wherein the first control signal operates the first switch, an inverted signal of the first control signal operates the second switch, the second control signal operates the third switch and an inverted signal of the second control signal operates the fourth switch;
   wherein k is 3, and the k levels of voltages include the first voltage, the ground potential and one half of the first voltage.

11. The multi-level switching converter circuit of claim 1, wherein the conversion control circuit generates the first control signal and the second control signal not according to a voltage sensing signal, wherein the voltage sensing signal is generated by sensing the flying capacitor voltage.

12. A multi-level switching conversion method for converting a first voltage to a second voltage or convert the second voltage to the first voltage, the multi-level switching conversion method comprising:
   switching a flying capacitor and an inductor by a plurality of power switches of a power stage circuit coupled between the first voltage and the second voltage;
   generating a first control signal for periodically operating a first portion of the plurality of power switches of the power stage circuit and a second control signal for periodically operating a second portion of the plurality of power switches of the power stage circuit;
   generating a first ramp signal to determine a first duty ratio of the first control signal, and generating a second ramp signal to determine a second duty ratio of the second control signal through a valley current mode control, thereby a switching node connected to one end of the inductor is switched between two of k levels of voltages, such that the first voltage or the second voltage is regulated to a predetermined target level, and a flying capacitor voltage across the flying capacitor is regulated and balanced at one (k−1)th of the first voltage;
   wherein k is an integer equal to or greater than 3, and the k levels of voltages include the first voltage, a ground potential and at least one divided voltage of the first voltage.

13. The multi-level switching conversion method of claim 12, wherein the first duty ratio is determined according to the first ramp signal, a current sensing signal and a feedback related signal, wherein a starting time point of a pulse of the first control signal determines a first valley of a current sensing signal, thereby the valley current mode control;
   wherein the second duty ratio is determined according to the second ramp signal, the current sensing signal and the feedback related signal, wherein a starting time point of a pulse of the second control signal determines a second valley of the current sensing signal, thereby achieving the valley current mode control;
   wherein the pulse of the first control signal has the first duty ratio, wherein the pulse of the second control signal has the second duty ratio, wherein the current sensing signal is positively related to an inductor current flowing through the inductor, and the feedback related signal is related to a feedback signal which is related to the second voltage or the first voltage.

14. The multi-level switching conversion method of claim 13, wherein a first signal group includes the first ramp signal, the current sensing signal and the feedback related signal, and a first one and a second one of the first signal group are superimposed and then compared with a third one of the first signal group to determine the starting time point of the pulse of the first control signal, and an end time point of the pulse of the first control signal is triggered by a first clock signal, wherein the first one, the second one and the third one of the first signal group are different between each other;
   wherein a second group of signals includes the second ramp signal, the current sensing signal and the feedback related signal, and a first one and a second one of the second signal group are superimposed and then compared with a third one of the second signal group to determine the starting time point of the pulse of the second control signal, and an end time point of the pulse of the second control signal is triggered by a second clock signal, wherein the first one, the second one and the third one of the second signal group are different between each other.

15. The multi-level switching conversion method of claim 14, wherein the first one, the second one and the third one of the first signal group are corresponded to the feedback related signal, the first ramp signal and the current sensing signal respectively;
   wherein the first one, the second one and the third one of the second signal group are corresponded to the feedback related signal, the second ramp signal and the current sensing signal respectively.

16. The multi-level switching conversion method of claim 14, wherein the first ramp signal is synchronized by the first clock signal, and the second ramp signal is synchronized by the second clock signal.

17. The multi-level switching conversion method of claim 16, wherein the first clock signal and the second clock signal have a same fixed frequency.

18. The multi-level switching conversion method of claim 17, wherein a phase-shift between the first ramp signal and the second ramp is 360 divided by (k−1) degrees.

19. The multi-level switching conversion method of claim 13, wherein through the valley current mode control, a conductive period of the pulse of the first control signal is inversely correlated to the flying capacitor voltage, and a conductive period of the pulse of the second control signal is positively correlated to the flying capacitor voltage, as thus, the flying capacitor voltage is balanced.

20. The multi-level switching conversion method of claim 12, wherein the first control signal and the second control signal are generated not according to a voltage sensing signal, wherein the voltage sensing signal is generated by sensing the flying capacitor voltage.

21. A multi-level switching converter circuit configured to convert a first voltage to a second voltage or convert the second voltage to the first voltage, the multi-level switching converter comprising:
- a first power stage circuit, which is coupled between the first voltage and the second voltage, and includes a plurality of first power switches for switching a first flying capacitor and a first inductor;
- a second power stage circuit, which is coupled between the first voltage and the second voltage, and includes a plurality of second power switches for switching a second flying capacitor and a second inductor; and
- a conversion control circuit, which is configured to generate a first control signal, a second control signal, a third control signal and a fourth control signal, wherein the first control signal is for periodically operating a first portion of the plurality of first power switches, the second control signal is for periodically operating a second portion of the plurality of first power switches, the third control signal is for periodically operating a first portion of the plurality of second power switches, and the fourth control signal is for periodically operating a second portion of the plurality of second power switches;
- wherein through a first valley current mode control, the conversion control circuit generates a first ramp signal to determine a first duty ratio of the first control signal, and generates a second ramp signal to determine a second duty ratio of the second control signal, thereby a first switching node connected to one end of the first inductor is switched between two of k levels of voltages, such that the first voltage or the second voltage is regulated to a predetermined target level, and a first flying capacitor voltage across the first flying capacitor is regulated and balanced at one (k−1)th of the first voltage;
- wherein through a second valley current mode control, the conversion control circuit generates a third ramp signal to determine a third duty ratio of the third control signal, and generates a fourth ramp signal to determine a fourth duty ratio of the fourth control signal, thereby a second switching node connected to one end of the second inductor is switched between two of p levels of voltages, such that the first voltage or the second voltage is regulated to the predetermined target level, and a second flying capacitor voltage across the second flying capacitor is regulated and balanced at one (p−1)th of the first voltage;
- wherein k and p are both integers equal to or greater than 3, and the k levels of voltages include the first voltage, a ground potential and at least one divided voltage of the first voltage, and the p levels of voltages include the first voltage, a ground potential and at least one divided voltage of the first voltage.

22. The multi-level switching converter circuit of claim 21, wherein the first duty ratio is determined according to the first ramp signal, a first current sensing signal and a feedback related signal, wherein a starting time point of a pulse of the first control signal determines a first valley of the first current sensing signal, thereby achieving the first valley current mode control;
- wherein the second duty ratio is determined according to the second ramp signal, the first current sensing signal and the feedback related signal, wherein a starting time point of a pulse of the second control signal determines a second valley of the first current sensing signal, thereby achieving the first valley current mode control;
- wherein the third duty ratio is determined according to the third ramp signal, a second current sensing signal and the feedback related signal, wherein a starting time point of a pulse of the third control signal determines a third valley of the second current sensing signal, thereby achieving the second valley current mode control;
- wherein the fourth duty ratio is determined according to the fourth ramp signal, the second current sensing signal and the feedback related signal, wherein a starting time point of a pulse of the fourth control signal determines a fourth valley of the second current sensing signal, thereby achieving the second valley current mode control;
- wherein the pulse of the first control signal has the first duty ratio, wherein the pulse of the second control signal has the second duty ratio, wherein the first current sensing signal is positively related to an inductor current flowing through the first inductor, and the feedback related signal is related to a feedback signal which is related to the second voltage or the first voltage;
- wherein the pulse of the third control signal has the third duty ratio, wherein the pulse of the fourth control signal has the fourth duty ratio, wherein the second current sensing signal is positively related to an inductor current flowing through the second inductor.

23. The multi-level switching converter circuit of claim 22, wherein a first signal group includes the first ramp signal, the first current sensing signal and the feedback related signal, and a first one and a second one of the first signal group are superimposed and then compared with a third one of the first signal group to determine the starting time point of the pulse of the first control signal, and an end time point of the pulse of the first control signal is triggered by a first clock signal, wherein the first one, the second one and the third one of the first signal group are different between each other;
- wherein a second group of signals includes the second ramp signal, the first current sensing signal and the feedback related signal, and a first one and a second one of the second group of signals are superimposed and then compared with a third one of the second group of signals to determine the starting time point of the pulse of the second control signal, and an end time point of the pulse of the second control signal is triggered by a second clock signal, wherein the first one, the second one and the third one of the second group of signals are different between each other;
- wherein a third signal group includes the third ramp signal, the second current sensing signal and the feedback related signal, and a first one and a second one of the third signal group are superimposed and then compared with a third one of the third signal group to determine the starting time point of the pulse of the third control signal, and an end time point of the pulse of the third control signal is triggered by a third clock signal, wherein the first one, the second one and the third one of the third signal group are different between each other;

wherein a fourth group of signals includes the fourth ramp signal, the second current sensing signal and the feedback related signal, and a first one and a second one of the fourth group of signals are superimposed and then compared with a third one of the fourth group of signals to determine the starting time point of the pulse of the fourth control signal, and an end time point of the pulse of the fourth control signal is triggered by a fourth clock signal, wherein the first one, the second one and the third one of the second group of signals are different between each other.

24. The multi-level switching converter circuit of claim 23, wherein the first one, the second one and the third one of the first signal group are corresponded to the feedback related signal, the first ramp signal and the first current sensing signal respectively;

wherein the first one, the second one and the third one of the second signal group are corresponded to the feedback related signal, the second ramp signal and the first current sensing signal respectively;

wherein the first one, the second one and the third one of the third signal group are corresponded to the feedback related signal, the third ramp signal and the second current sensing signal respectively;

wherein the first one, the second one and the third one of the fourth signal group are corresponded to the feedback related signal, the fourth ramp signal and the second current sensing signal respectively.

25. The multi-level switching converter circuit of claim 23, wherein the first ramp signal is synchronized by the first clock signal, and the second ramp signal is synchronized by the second clock signal;

wherein the third ramp signal and the fourth ramp signal are synchronized by the third clock signal and the fourth clock signal respectively.

26. The multi-level switching converter circuit of claim 25, wherein the first clock signal, the second clock signal, the third clock signal and the fourth clock signal have a same fixed frequency.

27. The multi-level switching converter circuit of claim 23, wherein a phase-shift between the first ramp signal and the second ramp signal is 360 divided by (k−1) degrees; and/or wherein a phase-shift between the third ramp signal and the fourth ramp signal is 360 divided by (p−1) degrees.

28. The multi-level switching converter circuit of claim 22, wherein through the first valley current mode control, a conductive period of the pulse of the first control signal is inversely correlated to the first flying capacitor voltage, and a conductive period of the pulse of the second control signal is positively correlated to the first flying capacitor voltage, as thus, the first flying capacitor voltage is balanced;

wherein through the second valley current mode control, a conductive period of the pulse of the third control signal is inversely correlated to the second flying capacitor voltage, and a conductive period of the pulse of the fourth control signal is positively correlated to the second flying capacitor voltage, as thus, the second flying capacitor voltage is balanced.

29. The multi-level switching converter circuit of claim 21, wherein the first current sensing signal is obtained by coupling a first DC resistance (DCR) current sense circuit to the first inductor; and/or wherein the second current sensing signal is obtained by coupling a second DC resistance (DCR) current sense circuit to the second inductor.

30. The multi-level switching converter circuit of claim 29, wherein the first portion of the plurality of first power switches includes a first switch and a second switch, and the second portion of the plurality of first power switches includes a third switch and a fourth switch;

wherein the first switch is coupled between the first voltage and a first end of the first flying capacitor, the second switch is coupled between a second end of the first flying capacitor and the ground potential, the third switch is coupled between the first end of the first flying capacitor and the first switching node, and the fourth switch is coupled between the second end of the first flying capacitor and the first switching node;

wherein the first control signal operates the first switch, an inverted signal of the first control signal operates the second switch, the second control signal operates the third switch and an inverted signal of the second control signal operates the fourth switch;

wherein k is 3, and the k levels of voltages include the first voltage, the ground potential and one half of the first voltage;

wherein the first portion of the plurality of second power switches includes a fifth switch and a sixth switch, and the second portion of the plurality of second power switches includes a seventh switch and an eighth switch;

wherein the fifth switch is coupled between the first voltage and a first end of the second flying capacitor, the sixth switch is coupled between a second end of the second flying capacitor and the ground potential, the seventh switch is coupled between the first end of the second flying capacitor and the second switching node, and the eighth switch is coupled between the second end of the second flying capacitor and the second switching node;

wherein the third control signal operates the fifth switch, an inverted signal of the third control signal operates the sixth switch, the fourth control signal operates the seventh switch and an inverted signal of the fourth control signal operates the eighth switch;

wherein p is 3, and the p levels of voltages include the first voltage, the ground potential and one half of the first voltage.

* * * * *